(12) United States Patent
Lethellier et al.

(10) Patent No.: US 11,437,854 B2
(45) Date of Patent: Sep. 6, 2022

(54) VARIABLE WIRELESS POWER TRANSFER SYSTEM

(71) Applicant: Wireless Advanced Vehicle Electrification, Inc., Salt Lake City, UT (US)

(72) Inventors: Patrice Lethellier, Herriman, UT (US); Marcellus Harper, Kaysville, UT (US)

(73) Assignee: Wireless Advanced Vehicle Electrification, LLC, Salt Lake City, UT (US)

( * ) Notice: Subject to any disclaimer, the term of this patent is extended or adjusted under 35 U.S.C. 154(b) by 144 days.

(21) Appl. No.: 16/273,992

(22) Filed: Feb. 12, 2019

(65) Prior Publication Data
US 2019/0252921 A1    Aug. 15, 2019

Related U.S. Application Data

(60) Provisional application No. 62/629,397, filed on Feb. 12, 2018.

(51) Int. Cl.
*H02J 50/12* (2016.01)
*H02J 7/02* (2016.01)
(Continued)

(52) U.S. Cl.
CPC ............. *H02J 50/12* (2016.02); *H01F 27/30* (2013.01); *H01F 27/38* (2013.01); *H01F 38/14* (2013.01); *H02J 7/025* (2013.01); *H01F 27/36* (2013.01)

(58) Field of Classification Search
CPC . H02J 50/12; H02J 7/025; H02J 50/70; H01F 38/14; H01F 27/38; H01F 27/30; H01F 27/36
See application file for complete search history.

(56) References Cited

U.S. PATENT DOCUMENTS

| | | | | |
|---|---|---|---|---|
| 4,647,910 A | * | 3/1987 | Torre | ................. G08B 13/2488 340/551 |
| 5,978,242 A | | 11/1999 | Raad et al. | |

(Continued)

FOREIGN PATENT DOCUMENTS

| | | |
|---|---|---|
| CA | 2908352 C | 10/2014 |
| CN | 1825505 A | 8/2006 |

(Continued)

OTHER PUBLICATIONS

Choi, "Generalized Models on Self-Decoupled Dual Pick-up Coils for Large Lateral Tolerance" IEEE Transactions On Power Electronics, vol. 30, No. 11, Nov. 2015, pp. 6434-6445 (Year: 2015).*

(Continued)

*Primary Examiner* — Pinping Sun
(74) *Attorney, Agent, or Firm* — Han Santos, PLLC

(57) ABSTRACT

An apparatus for secondary wireless power transfer includes a WPT secondary pad that receives power wirelessly from a WPT primary pad. The secondary pad includes a first winding and a second winding in parallel with the first winding. The apparatus includes a first rectification section that receives power from the first winding and a second rectification section that receives power from the second winding. The first rectification section is connected in parallel with the second rectification section. The parallel connection between the first and second rectification sections form output terminals. The apparatus includes a switch connecting the first winding in series with the second winding and a controller that intermittently opens and closes the switch to control voltage and current at the output terminals.

20 Claims, 11 Drawing Sheets

(51) Int. Cl.
  *H01F 27/30* (2006.01)
  *H01F 38/14* (2006.01)
  *H01F 27/38* (2006.01)
  *H01F 27/36* (2006.01)

(56) References Cited

U.S. PATENT DOCUMENTS

| | | | |
|---|---|---|---|
| 6,040,986 A | 3/2000 | Sakamoto et al. | |
| 6,630,805 B2 * | 10/2003 | Makaran | H02M 3/155 |
| | | | 318/400.26 |
| 8,093,758 B2 | 1/2012 | Hussmann et al. | |
| 8,169,185 B2 | 5/2012 | Partovi et al. | |
| 8,304,935 B2 | 11/2012 | Karalis et al. | |
| 8,710,701 B2 | 4/2014 | Cook et al. | |
| 8,810,071 B2 | 8/2014 | Sauerlaender et al. | |
| 8,854,011 B2 * | 10/2014 | Ichikawa | B60L 53/22 |
| | | | 320/138 |
| 8,884,581 B2 | 11/2014 | Widmer et al. | |
| 8,912,687 B2 | 12/2014 | Kesler et al. | |
| 9,306,635 B2 | 4/2016 | Kurs et al. | |
| 9,306,636 B2 | 4/2016 | Kwon et al. | |
| 9,442,172 B2 | 9/2016 | Verghese et al. | |
| 9,530,556 B2 | 12/2016 | Davila et al. | |
| 9,682,632 B2 | 6/2017 | Brill et al. | |
| 9,767,955 B2 | 9/2017 | Boys et al. | |
| 9,837,204 B2 | 12/2017 | Widmer et al. | |
| 9,954,387 B2 | 4/2018 | Sultenfuss et al. | |
| 9,973,038 B2 | 5/2018 | Li et al. | |
| 10,205,384 B2 | 2/2019 | Lethellier et al. | |
| 10,369,894 B2 | 8/2019 | McCool et al. | |
| 10,493,855 B2 | 12/2019 | Chase et al. | |
| 10,978,245 B2 | 4/2021 | Lethellier | |
| 10,988,042 B1 | 4/2021 | Chase | |
| 2002/0093313 A1 | 7/2002 | Hoffmann et al. | |
| 2004/0203986 A1 | 10/2004 | Gagnon | |
| 2008/0079392 A1 | 4/2008 | Baarman et al. | |
| 2008/0129246 A1 | 6/2008 | Morita et al. | |
| 2009/0067207 A1 * | 3/2009 | Nishino | H02M 7/08 |
| | | | 363/126 |
| 2009/0160262 A1 | 6/2009 | Schmidt et al. | |
| 2010/0017249 A1 | 1/2010 | Fincham et al. | |
| 2010/0080028 A1 | 4/2010 | Cheng et al. | |
| 2010/0225271 A1 | 9/2010 | Oyobe et al. | |
| 2011/0127845 A1 | 6/2011 | Walley et al. | |
| 2011/0127951 A1 | 6/2011 | Walley et al. | |
| 2011/0254503 A1 | 10/2011 | Widmer et al. | |
| 2011/0285349 A1 | 11/2011 | Widmer et al. | |
| 2011/0304217 A1 | 12/2011 | Yamamoto et al. | |
| 2012/0043172 A1 | 2/2012 | Ichikawa | |
| 2012/0068655 A1 | 3/2012 | Inuduka et al. | |
| 2012/0089202 A1 | 4/2012 | Staller | |
| 2012/0146580 A1 | 6/2012 | Kitamura et al. | |
| 2012/0161696 A1 | 6/2012 | Cook et al. | |
| 2012/0217818 A1 | 8/2012 | Yerazunis et al. | |
| 2012/0235504 A1 | 9/2012 | Kesler et al. | |
| 2012/0235566 A1 | 9/2012 | Karalis et al. | |
| 2012/0235636 A1 | 9/2012 | Partovi | |
| 2012/0249059 A1 * | 10/2012 | Matsumae | H02M 3/337 |
| | | | 363/17 |
| 2012/0306439 A1 * | 12/2012 | Ichikawa | B60L 50/61 |
| | | | 320/108 |
| 2013/0002034 A1 | 1/2013 | Onizuka et al. | |
| 2013/0033351 A1 | 2/2013 | Kim et al. | |
| 2013/0038272 A1 | 2/2013 | Sagata | |
| 2013/0039099 A1 | 2/2013 | Wu et al. | |
| 2013/0062959 A1 | 3/2013 | Lee et al. | |
| 2013/0088090 A1 | 4/2013 | Wu et al. | |
| 2013/0119773 A1 * | 5/2013 | Davis | H02J 50/70 |
| | | | 307/104 |
| 2013/0127253 A1 | 5/2013 | Stark et al. | |
| 2013/0181667 A1 | 7/2013 | Takeshita et al. | |
| 2013/0181668 A1 | 7/2013 | Tabata et al. | |
| 2013/0188397 A1 * | 7/2013 | Wu | H01F 38/14 |
| | | | 363/17 |
| 2013/0207468 A1 * | 8/2013 | Wu | H02M 7/53871 |
| | | | 307/31 |
| 2013/0207601 A1 | 8/2013 | Wu et al. | |
| 2013/0214735 A1 | 8/2013 | Kang et al. | |
| 2013/0236337 A1 | 9/2013 | Gummin et al. | |
| 2013/0249299 A1 | 9/2013 | Shijo et al. | |
| 2013/0272044 A1 | 10/2013 | Boys et al. | |
| 2013/0293192 A1 | 11/2013 | Abe et al. | |
| 2013/0307468 A1 | 11/2013 | Lee et al. | |
| 2014/0008995 A1 | 1/2014 | Kanno | |
| 2014/0015328 A1 | 1/2014 | Beaver et al. | |
| 2014/0077614 A1 | 3/2014 | Park et al. | |
| 2014/0125140 A1 | 5/2014 | Widmer et al. | |
| 2014/0153289 A1 * | 6/2014 | Kao | H02M 3/3376 |
| | | | 363/17 |
| 2014/0183967 A1 | 7/2014 | Ryu et al. | |
| 2014/0203662 A1 | 7/2014 | Bae | |
| 2014/0225439 A1 | 8/2014 | Mao | |
| 2014/0239729 A1 | 8/2014 | Covic | |
| 2014/0254208 A1 * | 9/2014 | Dai | H02M 3/335 |
| | | | 363/21.02 |
| 2015/0028478 A1 | 1/2015 | Meyer et al. | |
| 2015/0042168 A1 | 2/2015 | Widmer | |
| 2015/0077053 A1 | 3/2015 | Stamenic et al. | |
| 2015/0091517 A1 | 4/2015 | Blum et al. | |
| 2015/0145634 A1 | 5/2015 | Kurz et al. | |
| 2015/0155095 A1 * | 6/2015 | Wu | H02J 50/402 |
| | | | 307/104 |
| 2015/0170833 A1 | 6/2015 | Widmer et al. | |
| 2015/0236546 A1 | 8/2015 | Kesler et al. | |
| 2015/0246614 A1 | 9/2015 | Dames et al. | |
| 2015/0263532 A1 | 9/2015 | Van Wageningen | |
| 2015/0263640 A1 | 9/2015 | Russell et al. | |
| 2015/0302985 A1 | 10/2015 | Kurs | |
| 2015/0310722 A1 | 10/2015 | Sousa et al. | |
| 2015/0364929 A1 | 12/2015 | Davis | |
| 2016/0141097 A1 | 5/2016 | Oo et al. | |
| 2016/0233728 A1 | 8/2016 | Park et al. | |
| 2016/0241086 A1 | 8/2016 | Jung et al. | |
| 2016/0285317 A1 * | 9/2016 | Maniktala | H02J 50/70 |
| 2016/0294189 A1 * | 10/2016 | Uno | H02S 50/10 |
| 2016/0336816 A1 | 11/2016 | Mach et al. | |
| 2016/0380469 A1 | 12/2016 | Lethellier et al. | |
| 2017/0018970 A1 * | 1/2017 | Zhang | H02J 50/12 |
| 2017/0040845 A1 | 2/2017 | Yuasa et al. | |
| 2017/0057370 A1 | 3/2017 | Harper | |
| 2017/0063170 A1 | 3/2017 | Harper | |
| 2017/0149294 A1 | 5/2017 | Wight et al. | |
| 2017/0271924 A1 | 9/2017 | Mao et al. | |
| 2017/0279307 A1 * | 9/2017 | Cho | H02J 7/025 |
| 2017/0324281 A1 | 11/2017 | Che | |
| 2018/0040416 A1 | 2/2018 | Lestoquoy | |
| 2018/0048184 A1 | 2/2018 | Stout, II et al. | |
| 2018/0062421 A1 | 3/2018 | Danilovic et al. | |
| 2018/0351415 A1 | 12/2018 | Masquelier et al. | |
| 2018/0361863 A1 | 12/2018 | Islinger et al. | |
| 2018/0367030 A1 * | 12/2018 | Lethellier | H02M 1/4241 |
| 2019/0051452 A1 | 2/2019 | Lethellier | |
| 2019/0131823 A1 * | 5/2019 | Ahn | H02J 50/12 |
| 2019/0198239 A1 | 6/2019 | Xu et al. | |
| 2019/0238001 A1 | 8/2019 | Lethellier | |

FOREIGN PATENT DOCUMENTS

| | | | |
|---|---|---|---|
| CN | 1901345 A * | 1/2007 | |
| CN | 101346870 A | 1/2009 | |
| CN | 102280945 A | 12/2011 | |
| CN | 102299631 A * | 12/2011 | |
| CN | 102870338 | 1/2013 | |
| CN | 103262387 B | 8/2016 | |
| CN | 103918170 B | 3/2017 | |
| CN | 104416266 B | 4/2017 | |
| CN | 106740220 A | 5/2017 | |
| CN | 110999063 A | 2/2020 | |
| CN | 111183564 A | 4/2020 | |
| DE | 102014218067 A1 | 3/2016 | |
| EP | 2390984 A2 | 11/2011 | |
| EP | 2752957 A1 | 7/2014 | |

(56) References Cited

FOREIGN PATENT DOCUMENTS

| | | | |
|---|---|---|---|
| EP | 2833509 A1 | 2/2015 | |
| EP | 2985870 A1 | 2/2016 | |
| EP | 2819272 B1 | 12/2017 | |
| EP | 3669437 A4 | 3/2020 | |
| EP | 3639359 A4 | 4/2020 | |
| JP | 2003284343 A | 10/2003 | |
| JP | 2016220312 | 12/2016 | |
| JP | 2016220312 A | 12/2016 | |
| KR | 100698177 B1 | 3/2007 | |
| KR | 20150054641 A | 5/2015 | |
| RU | 99667 | 11/2010 | |
| RU | 2505919 C1 | 1/2014 | |
| SU | 736298 | 5/1980 | |
| TW | M508836 U | 9/2015 | |
| WO | 2008140333 A2 | 11/2008 | |
| WO | 2009081126 A1 | 7/2009 | |
| WO | 2011156768 A2 | 12/2011 | |
| WO | 2012018268 | 2/2012 | |
| WO | 2012099965 A3 | 7/2012 | |
| WO | 2012125590 A2 | 9/2012 | |
| WO | 2013011726 A1 | 1/2013 | |
| WO | 2013056234 A3 | 4/2013 | |
| WO | 2013112609 A1 | 8/2013 | |
| WO | 2013112613 | 8/2013 | |
| WO | 2013112614 | 8/2013 | |
| WO | 2014130065 A1 | 8/2014 | |
| WO | 2015085013 A1 | 6/2015 | |
| WO | 2016113949 A1 | 7/2016 | |
| WO | 2018232416 A1 | 12/2018 | |

OTHER PUBLICATIONS

Li, "A Novel WPT System Based on Dual Transmitters and Dual Receivers for High Power Applications: Analysis, Design and Implementation". Energies 2017, 10, 174, pp. 1-16 (Year: 2017).*
Chinese Patent Application No. 201880053435.9, Office Action dated Jul. 13, 2021, 9 pages.
Chinese Patent Application No. 201680050311.6, Office Action dated Apr. 2, 2021, 10 pages.
International Application No. PCT/US2016/039889, International Search Report and Written Opinion dated Oct. 6, 2016, 9 pages.
Kaczmarczyk et al., A multi-coil wireless power transfer (MC-WPT) system—analysis method and properties, Measurement Automation Monitoring, Oct. 2015, vol. 61, No. 10, pp. 480-483.
U.S. Appl. No. 16/262,717, Notice of Allowance dated Jul. 22, 2021, 31 pages.
Chinese Patent Application No. 201680050311.6, Office Action dated Oct. 14, 2021, 9 pages.
Chinese Patent Application No. 201780029434.2, Office Action dated Aug. 4, 2021, 13 pages.
European Application No. 18891846.0, Extended European Search Report dated Aug. 17, 2021, 8 pages.
U.S. Appl. No. 16/262,717, Notice of Allowance dated Jan. 11, 2022, 60 pages.
Alekseev O.V. et al. EJST-TECH Devices. Moscow, ENERGOIZDAT, 1981, p. 22, fig.2.5 (a).
Basar et al., Application of Wireless Power Transmission Systems in Wireless Capsule Endoscopy: An Overview. Sensor, 2014, 14, pp. 10932-10934.
Chinese Patent Application 201880053435.9, Office Action dated Oct. 12, 2020.
drive2.com,Japanese puzzled wireless charging of electric vehicles, Pavel Greshnykh, 2016, https:/lwww.drive2.com/c/958023. Last visited Sep. 22, 2016.
European Patent Application No. 18846305.3, EESR dated Apr. 1, 2021, 13 pages.
European Patent Application No. 18818426.1, Search Report dated Jun. 1, 2021, 11 pages.
International Application No. PCT/US2018/038125, International Search Report and Written Opinion dated Oct. 4, 2018.
International Application No. PCT/US2018/046757, International Search Report and Written Opinion dated Nov. 8, 2018.
Kim et al., "Design methodology of a 500 W wireless power transfer converter", 2015 IEEE PELS Workshop On Emerging Technologies: Wireless Power (2015 WOW), IEEE, Jun. 5, 2015 (Jun. 5, 2015), pp. 1-6, XP032789382, DOI: 10.1109/WOW.2015.7132842 [retrieved on Jun. 24, 2015].
Morozov A.G. Ejschtrotechnika, Ejstkronika and Pulse Technology. Moscow, "High School", 1987, p. 200 paragraph 4, machine translation of paragraph included.
Mude et al., Design and experimentation of two-coil coupling for electric city-car WPT charging, Journal of Electromagnetic Waves and Applications, Nov. 29, 2015, p. 3.
U.S. Appl. No. 16/262,717, Notice of Allowance dated Mar. 25, 2021, 20 pages.
Chinese Patent Application No. 201880053435.9, Office Action dated May 11, 2022, 9 pages.
U.S. Appl. No. 16/262,717, Notice of Allowance dated May 10, 2022, 24 pages.

* cited by examiner

VARIABLE WIRELESS POWER TRANSFER SYSTEM

CROSS-REFERENCES TO RELATED APPLICATIONS

This application claims the benefit of U.S. Provisional Patent Application No. 62/629,397 entitled "VARIABLE WIRELESS POWER TRANSFER SYSTEM" and filed on Feb. 12, 2018 for Patrice Lethellier, et al., which is incorporated herein by reference for all purposes.

FIELD

This invention relates to wireless power transfer and more particularly relates to a variable wireless power transfer system.

BACKGROUND

Wireless power transfer ("WPT") is an emerging technology that is being used more frequently in many situations. One use of wireless power transfer is for electric vehicles. Electric vehicles are desirable for reduction in noise and pollution. However, a distance between a primary pad typically mounted in the ground and a secondary pad on a vehicle varies for various reasons, such as vehicle clearance, tire pressure, vehicle load, etc.

SUMMARY

An apparatus for secondary wireless power transfer includes a WPT secondary pad that receives power wirelessly from a WPT primary pad. The secondary pad includes a first winding and a second winding in parallel with the first winding. The apparatus includes a first rectification section that receives power from the first winding and a second rectification section that receives power from the second winding. The first rectification section is connected in parallel with the second rectification section. The parallel connection between the first and second rectification sections form output terminals. The apparatus includes a switch connecting the first winding in series with the second winding and a controller that intermittently opens and closes the switch to control voltage and current at the output terminals.

An apparatus for primary wireless power transfer includes a resonant section of a WPT converter where the resonant section includes a primary pad and the resonant section includes a first connection and a second connection. The apparatus includes a switching section with a full-bridge topology where the switching section includes a first leg and a second leg, each with a center point. The apparatus includes a rectification section with a full-bridge rectifier and the rectification section includes a first leg and a second leg, each with a center point. The apparatus includes a transformer with N turns with a first side and a second side. A first connection of the first side of the transformer is connected in series with the second connection of the resonant section. The apparatus includes a switch connected in parallel with the second side of the transformer and a controller to open and close the switch. The first connection of the resonant section and the second connection of the first side of the transformer are connected to the center points of the switching section, and the second side of the transformer is connected between the center points of the rectification section.

A system for wireless power transfer includes a primary converter apparatus and a secondary receiver apparatus. The primary power converter apparatus includes a resonant section of a WPT converter. The resonant section includes a primary pad, and the resonant section includes a first connection and a second connection. The primary power converter apparatus includes a switching section with a full-bridge topology. The switching section includes a first leg and a second leg, each with a center point. The primary power converter apparatus includes a rectification section with a full-bridge rectifier. The rectification section includes a first leg and a second leg, each with a center point. The primary power converter apparatus includes a transformer with N turns with a first side and a second side. A first connection of the first side of the transformer is connected in series with the second connection of the resonant section. The primary power converter apparatus includes a primary switch connected in parallel with the second side of the transformer and a primary controller to open and close the primary switch. The first connection of the resonant section and the second connection of the first side of the transformer are connected to the center points of the switching section, and the second side of the transformer is connected between the center points of the rectification section.

The secondary receiver apparatus includes a WPT secondary pad that receives power wirelessly from the WPT primary pad. The secondary pad includes a first winding and a second winding in parallel with the first winding. The secondary receiver apparatus includes a first rectification section that receives power from the first winding and a second rectification section that receives power from the second winding. The first rectification section is connected in parallel with the second rectification section, and the parallel connection between the first and second rectification sections forming output terminals. The secondary receiver apparatus includes a secondary switch connecting the first winding in series with the second winding and a secondary controller that intermittently opens and closes the secondary switch to control voltage and current at the output terminals.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
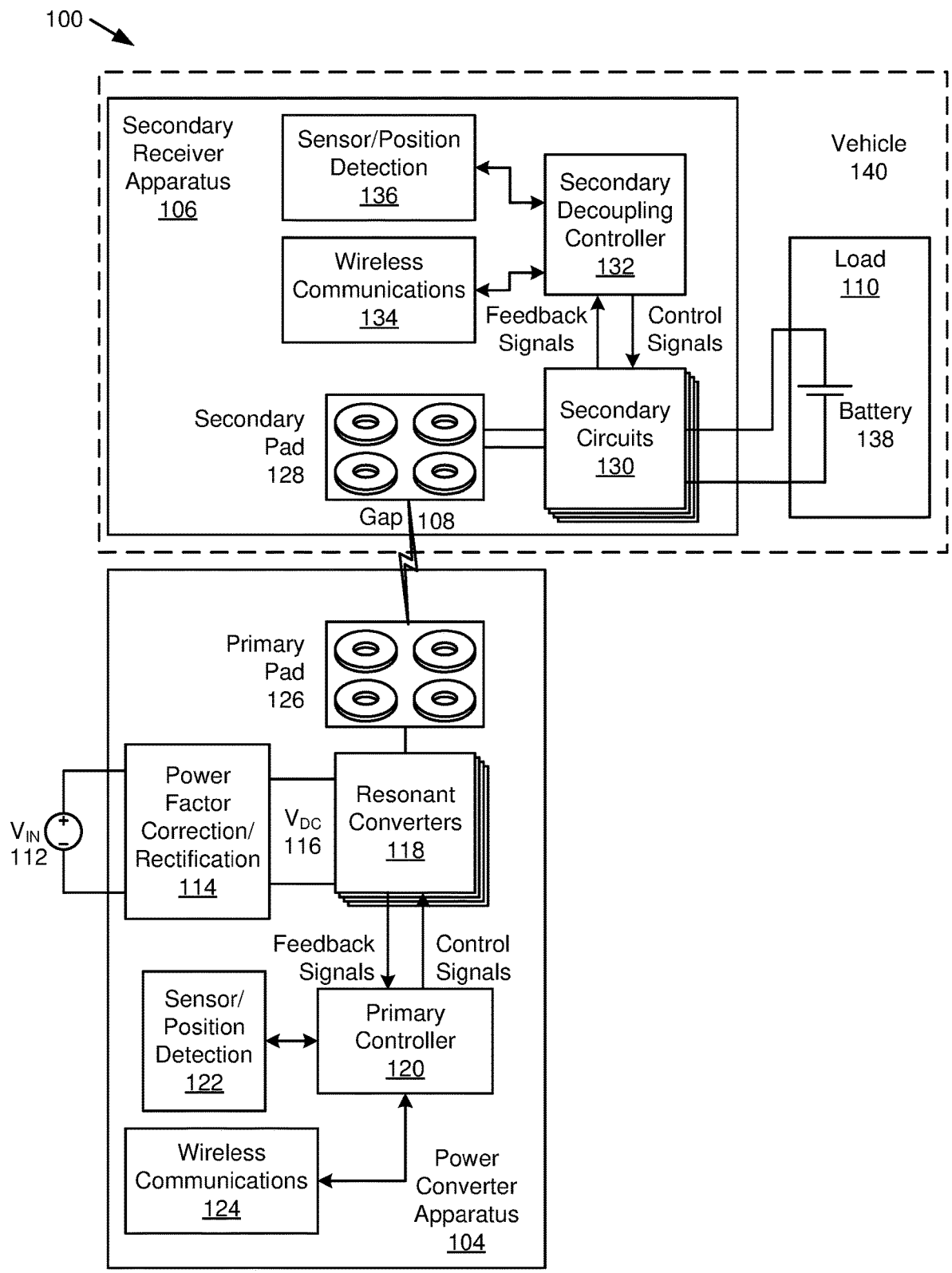
FIG. 1 is a schematic block diagram illustrating one embodiment of a system with a low voltage wireless power transfer ("WPT") pad.

Reference throughout this specification to "one embodiment," "an embodiment," or similar language means that a particular feature, structure, or N characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

An apparatus for secondary wireless power transfer includes a WPT secondary pad that receives power wirelessly from a WPT primary pad. The secondary pad includes a first winding and a second winding in parallel with the first winding. The apparatus includes a first rectification section that receives power from the first winding and a second rectification section that receives power from the second winding. The first rectification section is connected in parallel with the second rectification section. The parallel connection between the first and second rectification sections form output terminals. The apparatus includes a switch connecting the first winding in series with the second winding and a controller that intermittently opens and closes the switch to control voltage and current at the output terminals.

In some embodiments, each of the first rectification section and the second rectification section include a full bridge rectifier. In other embodiments, a first end of the first winding is connected to a center point of series-connected diodes of a first leg of the first rectification section and a second end of the first winding is connected to a center point of series-connected diodes of a second leg of the first rectification section and a first end of the second winding is connected to a center point of series-connected diodes of a first leg of the second rectification section and a second end of the second winding is connected to a center point of series-connected diodes of a second leg of the second rectification section. In other embodiments, a top of the first and second legs of the first and second rectification sections are connected to a first terminal of the output terminals, and a bottom of the first and second legs of the first and second rectification sections are connected to a second terminal of the output terminals.

In some embodiments, the controller operates the switch according to a duty cycle associated with a fundamental frequency of power received by the secondary pad. In other embodiments, the controller adjusts the duty cycle to adjust one or more of output voltage and output current of the output terminals. In other embodiments, the apparatus includes a snubber section that provides snubbing for the switch. In other embodiments, the apparatus includes a direct current ("DC") link capacitor in parallel with the output terminals.

An apparatus for primary wireless power transfer includes a resonant section of a WPT converter where the resonant section includes a primary pad and the resonant section includes a first connection and a second connection. The apparatus includes a switching section with a full-bridge topology where the switching section includes a first leg and a second leg, each with a center point. The apparatus includes a rectification section with a full-bridge rectifier and the rectification section includes a first leg and a second leg, each with a center point. The apparatus includes a transformer with N turns with a first side and a second side. A first connection of the first side of the transformer is connected in series with the second connection of the resonant section. The apparatus includes a switch connected in parallel with the second side of the transformer and a controller to open and close the switch. The first connection of the resonant section and the second connection of the first side of the transformer are connected to the center points of the switching section, and the second side of the transformer is connected between the center points of the rectification section.

In some embodiments, the legs of the rectification section and the legs of the switching section are connected in parallel and form input terminals to be connected to a power source. In other embodiments, the rectification section includes diodes. In other embodiments, the rectification section includes bidirectional switches. The switches are arranged to connect the second side of the transformer in a positive polarity and in a negative polarity. In other embodiments, the controller opens or closes the switch to select an output voltage applied to the resonant section.

In some embodiments, the controller operates the switch according to a duty cycle where the duty cycle is relative to a switching frequency of the switching section. In other embodiments, the controller varies the duty cycle to adjust a voltage applied to the resonant section. In other embodiments, the N turns of the transformer is selected based on an amount of voltage to be added to or subtracted from a source voltage to apply a particular voltage to the resonant section. In other embodiments, the resonant section includes one or more inductors and one or more capacitors arranged to be connected between the primary pad and the first and second connections of the resonant section. In further embodiments, the one or more inductors and one or more capacitors are arranged with the primary pad to form an inductor-capacitor-inductor ("LCL") load resonant converter.

A system for wireless power transfer includes a primary converter apparatus and a secondary receiver apparatus. The primary power converter apparatus includes a resonant section of a WPT converter. The resonant section includes a primary pad, and the resonant section includes a first connection and a second connection. The primary power converter apparatus includes a switching section with a full-bridge topology. The switching section includes a first leg and a second leg, each with a center point. The primary power converter apparatus includes a rectification section with a full-bridge rectifier. The rectification section includes a first leg and a second leg, each with a center point. The primary power converter apparatus includes a transformer with N turns with a first side and a second side. A first connection of the first side of the transformer is connected in series with the second connection of the resonant section. The primary power converter apparatus includes a primary switch connected in parallel with the second side of the transformer and a primary controller to open and close the primary switch. The first connection of the resonant section and the second connection of the first side of the transformer are connected to the center points of the switching section, and the second side of the transformer is connected between the center points of the rectification section.

The secondary receiver apparatus includes a WPT secondary pad that receives power wirelessly from the WPT primary pad. The secondary pad includes a first winding and a second winding in parallel with the first winding. The secondary receiver apparatus includes a first rectification section that receives power from the first winding and a second rectification section that receives power from the second winding. The first rectification section is connected in parallel with the second rectification section, and the parallel connection between the first and second rectification sections forming output terminals. The secondary receiver apparatus includes a secondary switch connecting the first winding in series with the second winding and a secondary controller that intermittently opens and closes the secondary switch to control voltage and current at the output terminals.

In some embodiments, the system includes two or more primary converter apparatus connected in parallel and two or more corresponding secondary receiver apparatuses connected in parallel. The two or more corresponding secondary receiver apparatuses connected in parallel feed a load. In other embodiments, the primary pad of each of the two or more primary converters includes a primary winding and the primary windings are configured to form a primary pad and the WPT secondary pad of each of the two or more corresponding secondary receiver apparatuses connected in in parallel includes a secondary winding and the secondary windings are configured to form a WPT secondary pad and each of the primary windings align with the secondary windings.

FIG. 1 is a schematic block diagram illustrating one embodiment of a wireless power transfer ("WPT") system 100 with a low voltage WPT pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, may be called a switching power converter and includes a resonant converter 118 that receives a direct current ("DC") voltage from a DC bus 116.

In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 (i.e. a primary WPT pad) that receives power from the resonant converter 118. In the depicted embodiment, the primary pad 126 includes four windings, which may also be termed "pads." To support the windings, the power converter apparatus 104 may include multiple resonant converters 118. In one embodiment, portions of the resonant converter 118 and primary pad 126 form a resonant circuit that enables efficient wireless power transfer across the gap 108. In another embodiment, the power converter apparatus 104 includes a switching power converter that is not a resonant converter. The gap 108, in some embodiments includes an air gap, but may also may partially or totally include other substances. For example, where the primary pad 126 is in a roadway, the gap 108 may include a resin, asphalt, concrete or other material just over the windings of the primary pad 126 in addition to air, snow, water, etc. between the primary pad 126 and a secondary pad 128 located in the secondary receiver apparatus 106.

The secondary receiver apparatus 106 includes a secondary pad 128 (i.e. a secondary WPT pad) connected to a secondary circuit 130 that delivers power to the load 110. In the depicted embodiment, the secondary pad 128 may include multiple windings, which may also be termed "pads." Each winding may feed a separate secondary circuit 130. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other portable load that would benefit from receiving power wirelessly.

In one embodiment, the secondary circuit 130 includes a portion of resonant circuit that interacts with the secondary pad 128 and that is designed to receive power at a resonant frequency. In another embodiment, the secondary circuit 130 includes a power conditioning circuit that is not a resonant circuit. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled to a resonant circuit formed with components of the resonant converter 118 and the primary pad 126. The resonant converter 118 is described in more detail with regard to FIGS. 2A and 2B.

Figure 2A:
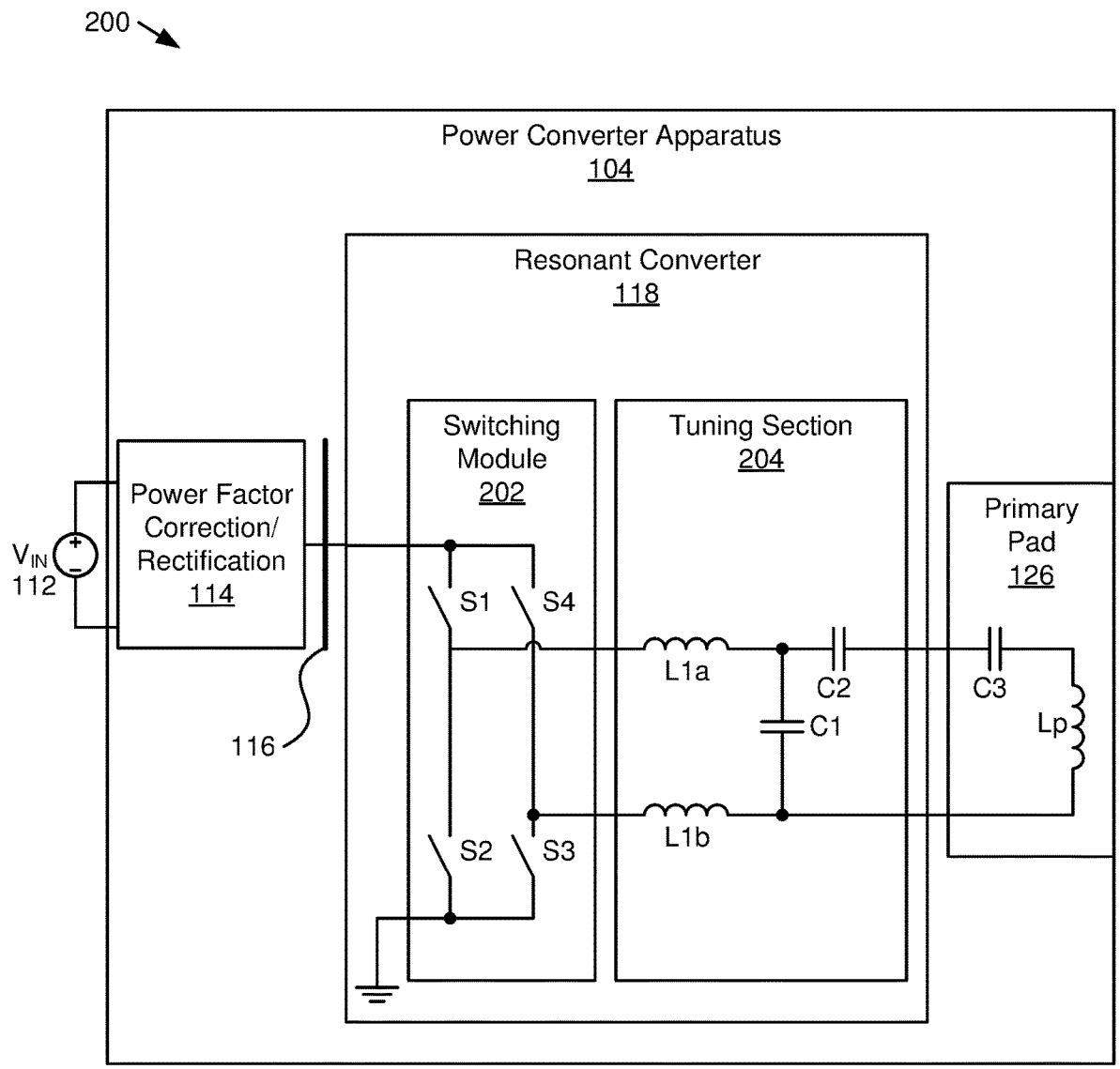
FIG. 2A is a schematic block diagram illustrating one embodiment of a power converter apparatus.

FIG. 2A is a schematic block diagram illustrating one embodiment 200 of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section 204 simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2A includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. In some embodiments, the power converter apparatus 104 includes a single series capacitor in the tuning section 204 or in the primary pad 126. While FIG. 2A is focused on the resonant converter 118 and primary pad 126, the secondary receiver apparatus 106 includes a secondary pad 128 and a secondary circuit 130 that typically includes a tuning section 204 where the inductance of the secondary pad 128 and capacitance of the tuning section 204 of the secondary circuit 130 form a resonant frequency and the secondary pad 128 and secondary circuit 130 have voltage issues similar to the primary pad 126 and resonant converter 118. In other embodiments, the tuning section 204 and primary pad 126 are not designed to produce a resonance, but instead condition voltage from the switching module 202. For example, the tuning section 204 may filter out harmonic content without filtering a switching frequency.

Figure 2B:
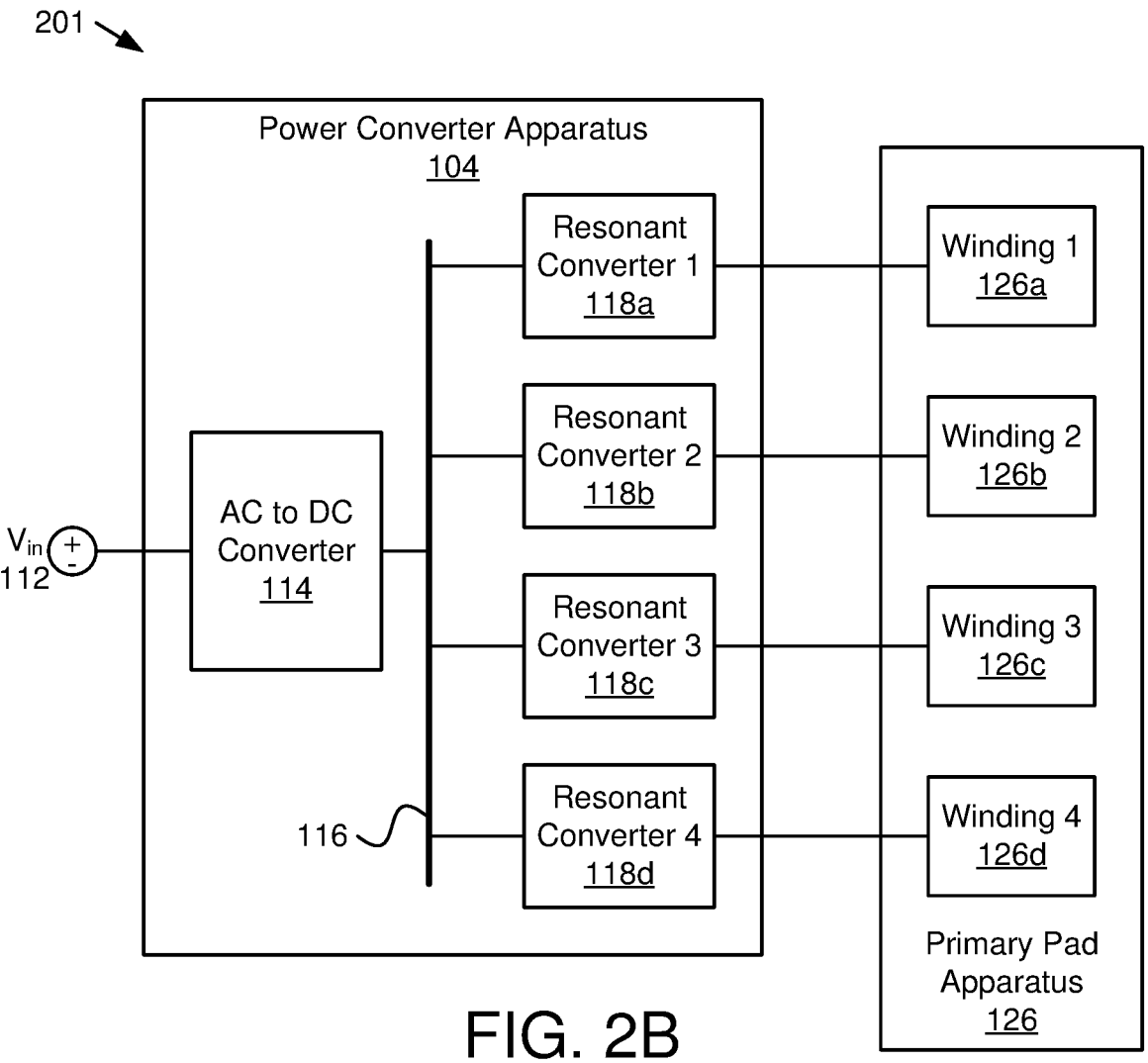
FIG. 2B is a schematic block diagram illustrating one embodiment of a power converter apparatus with multiple resonant converters feeding windings of one or more WPT pads and/or windings.

FIG. 2B is a schematic block diagram illustrating one embodiment 201 of a power converter apparatus 104 with multiple resonant converters 118a-d feeding windings 126a-d of one or more primary pads 126. FIG. 2B is presented in a one-line diagram format. One of skill in the art will recognize that each line between elements represents two or more conductors. The power source 112, power factor correction and rectification circuit 114 and DC bus 116 are substantially similar to those described in the embodiment 200 of FIG. 2A. The power converter apparatus 104 includes four resonant converters 118a-d (generically or individually "118") where each resonant converter 118 includes a switching module 202 and may include a tuning section 204. Each resonant converter 118 feed a winding (e.g. 126a) of a primary pad 126, which may include multiple windings 126a-d. The resonant converters 118, in some embodiments, are operated to provide a variable amount of power. For example, one or more of the resonant converters 118 may be shut off for providing less power to be transferred to a secondary receiver apparatus 106. In other embodiments, each of the windings 1-4 126a-d are arranged to align with four secondary pads 128a-d.

In some embodiments, a resonant converter (e.g. 118a) may feed an individual primary pad 126. In some examples, each of the individual primary pads 126a-d are arranged to provide power to individual secondary pads 128a-d where one secondary pad (e.g. 128a) feeds one load, another secondary pad (128b) feeds another load, etc. In other embodiments, two or three of the secondary pads (e.g. 128a,b or 128a-c) are grouped to feed loads. For example, a group of two secondary pads 128a-b may be grouped to feed one load while a third secondary pad 128c feeds a second load and a fourth secondary pad 128d feeds a third load. Other combinations are possible.

Figure 3A:
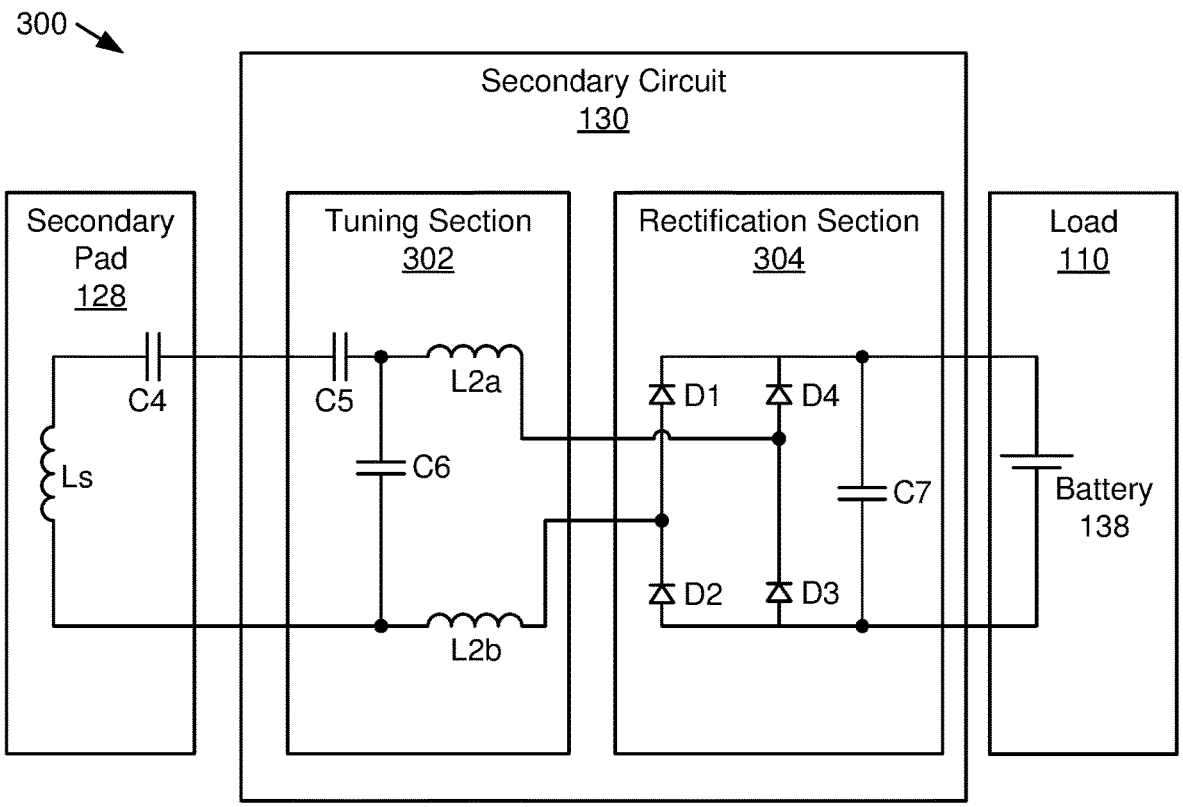
FIG. 3A is a schematic block diagram illustrating one embodiment of a secondary circuit feeding a load.

FIG. 3A is a schematic block diagram illustrating one embodiment 300 of a secondary circuit 130 feeding a load 110. A secondary pad 128 feeds a tuning section 302 within the secondary circuit 130 and the tuning section 302 feeds a rectification section 304 in the secondary circuit 130, which feeds a load 110.

The secondary pad 128 includes one or more windings arranged to receive power from a primary pad 126. The secondary pad 128 may include a ferrite structure and windings arranged in a pattern that efficiently receives power from the primary pad 126. In one embodiment, the secondary pad 128 mirrors the primary pad 126 transmitting power. In another embodiment, the secondary pad 128 differs from the primary pad 126. Typically, the secondary pad 128 includes an inductance Ls formed as a result of the windings and the ferrite structure of the secondary pad 128. In one embodiment, the secondary pad 128 includes a capacitor C4.

The tuning section 302 includes one or more capacitors C5, C6 and inductors L2a, L2b that are arranged to form a resonant circuit with the secondary pad 128 with a resonant frequency. In some embodiments, capacitor C6 is not present. In one embodiment, the resonant frequency matches a resonant frequency of the primary pad 126 transmitting power. Typically, a resonant frequency is formed between the inductor Ls of the secondary pad 128 and series capacitors C4 and C5 of the secondary pad 128 and/or tuning section 302. In some embodiments, the secondary pad 128 or the tuning section 302 include a single series capacitor C4 or C5. Other capacitors (e.g. C6) and inductors (e.g. L2a, L2b) may form a low pass filter to reduce voltage ripple at the resonant frequency. In other embodiments, a low-pass filter is included after rectification elements in the rectification section 304. For example, a capacitor C7 may be included. One of skill in the art will recognize other configurations of the tuning section 302 that form a resonant tank with the secondary pad 128 and pass energy to the rectification section 304 or another suitable circuit.

A rectification section 304 includes diodes, switches, or other rectification elements to convert alternating current ("AC") power to direct current ("DC") power. The rectification section 304 depicted in FIG. 3 includes a full bridge rectifier with four diodes D1-D4. In some embodiments, the diodes D1-D4 are replaced with active elements, such as switches, which may be used to reduce harmonics, reduce power consumption, and the like. For example, the rectification section 304 may include a switching power converter that controls an output voltage to the load 110.

The load 110, in one embodiment is a battery 138. In other embodiments, the load 110 may include other components, such as a motor, a resistive load, electronics, and the like. In one embodiment, the secondary pad 128, secondary circuit 130 and load 110 are part of a vehicle 140. In other embodiments, the secondary pad 128, secondary circuit 130 and load 110 are part of a computing device, a smartphone, and the like.

Figure 3B:
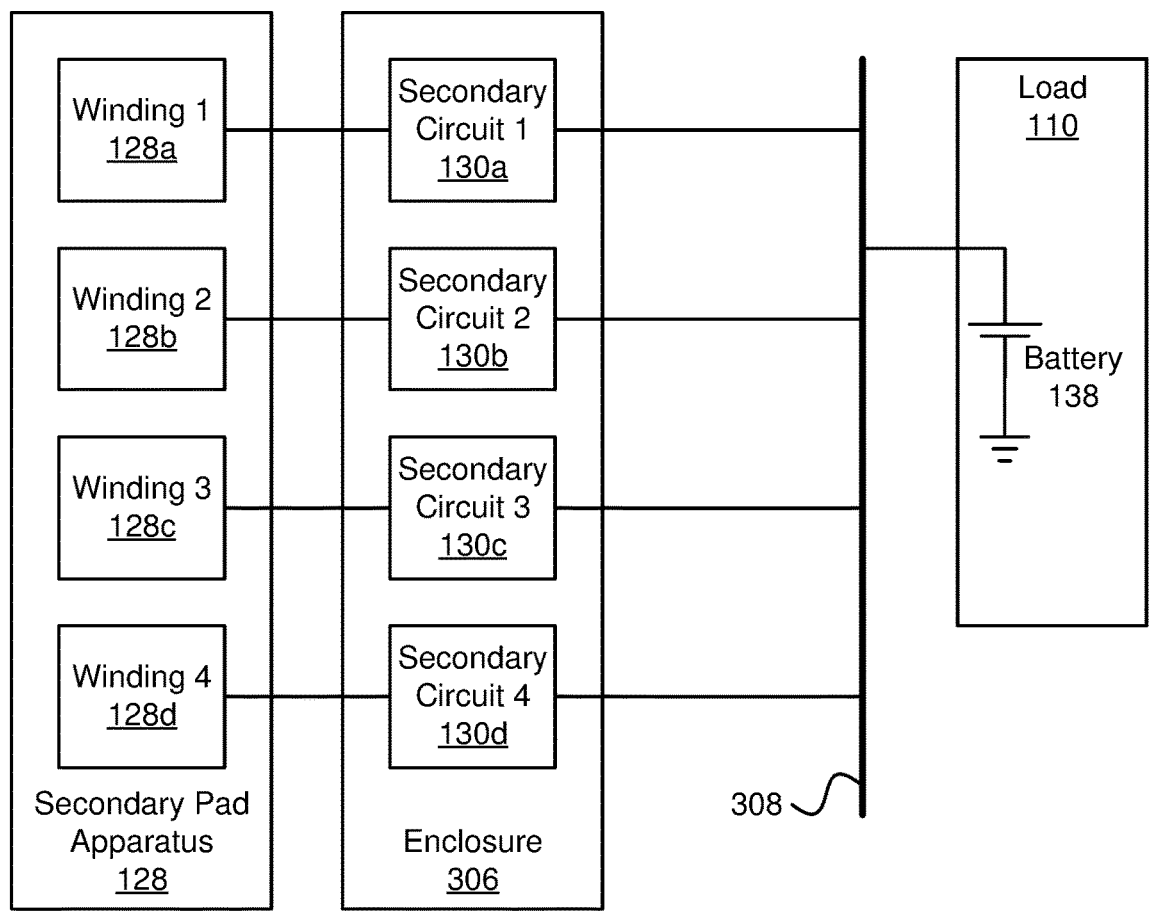
FIG. 3B is a schematic block diagram illustrating one embodiment of several windings of a secondary pad feeding several secondary circuits, which feed a load.

FIG. 3B is a schematic block diagram illustrating one embodiment 301 of several windings 128a-d of a secondary pad 128 feeding several secondary circuits 130a-d, which feed a load 110. The secondary circuits 130a-d, in one embodiment, are in an enclosure 306 and feed a secondary DC bus 308, which feeds the load 110. A secondary pad 128 with multiple windings 128a-d is advantageous to increase a power level and multiple windings 128a-d may also be used in determining alignment. Multi-winding pads 126, 128 are discussed in more detail below.

Figure 4:
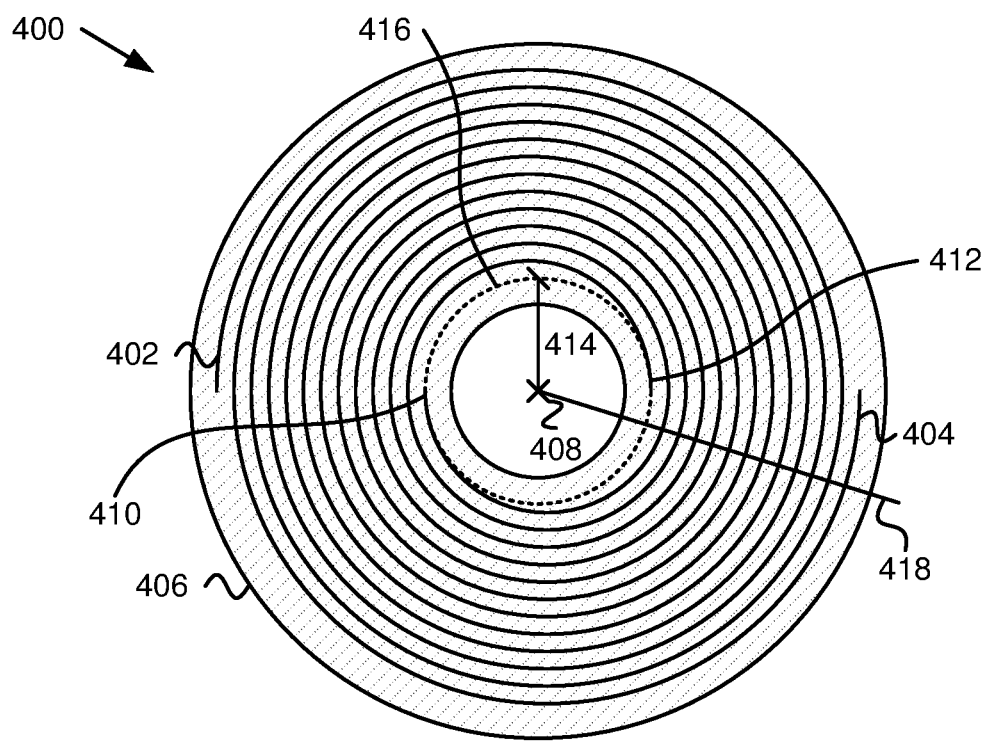
FIG. 4 is a schematic block diagram illustrating one embodiment of an apparatus for wireless power transfer with two coils and a ferrite structure.

FIG. 4 is a schematic block diagram illustrating one embodiment of an apparatus 400 for wireless power transfer with two coils and a ferrite structure. The apparatus 400 includes a first coil 402, a second coil 404, and a ferrite structure 406, which are described below.

The apparatus 400 includes a first coil 402 with a first conductor arranged in a winding pattern with a first winding around a center point 408 and each successive winding of the first coil 402 is further away from the center point 408 than the first winding and any previous windings. The apparatus 400 also includes a second coil 404 with a second conductor wound with respect to the first coil 402 where each coil of the second coil 404 is arranged between each winding of the first coil 402. The first coil 402 and second coil 404 are connected in parallel. Connection of the first coil 402 and the second coil 404 in parallel is not shown for clarity. Typically leads from the coils 402, 404 are connected so that the coils 402, 404 are connected in parallel. While two coils 402, 404 are depicted in FIG. 4, additional coils may be included and are described below.

Advantageously, by splitting a coil into two coils 402, 404 and connecting the coils 402, 404 in parallel, inductance is reduced with respect to a non-split design. A lower inductance requires less voltage to drive the coils 402, 404 so voltage requirements are less on the primary pad 126 to deliver a same amount of power to the secondary pad 128. A lower voltage may then allow a designer to eliminate a transformer, user parts with a lower voltage rating, etc.

The coils 402, 404 each include a conductor that is typically insulated. The insulation is typically rated for expected voltages, including spikes, transients, etc. The insulation keeps the conductors from contacting each other and from other grounded or ungrounded structures. The insulation may include a varnish, thermoplastic, nylon, cross-linked polyethylene, rubber, and other insulation materials known in the art. The conductors may be solid or stranded and may be flexible or solid. In one embodiment, the conductors are a litz wire to reduce skin effect. The litz wire may include numerous strands of wire where each strand is insulated. One of skill in the art will recognize other wire types, insulation, etc. suitable for wireless charging.

The apparatus 400 also includes a ferrite structure 406 positioned adjacent to the first coil 402 and the second coil 404. The ferrite structure 406, in one embodiment, includes a planar surface positioned adjacent to the coils 402, 404. Typically, the apparatus 400 is part of a charging pad, such as the primary pad 126 or secondary pad 128 and the ferrite structure 406 is designed to enhance a magnetic field above the coils 402, 404 to improve coupling with another receiver pad (e.g. 126, 128). The ferrite structure 406 is depicted as circular with an opening in the center of the ferrite structure 406, but one of skill in the art will recognize that other designs may be used for the ferrite structure. As used herein, "ferrite structure" includes any structure of a material that may be magnetized or that may be used in a transformer, such as the loosely coupled transformers formed by the primary pad 126, the secondary pad 128, and air gap 108 of FIG. 1, where current passing through coils (e.g. 402, 404) induces a magnetic field. The ferrite may include an iron oxide, a hematite, a magnetite, an oxide of other metals, or other ferromagnetic material.

In one embodiment, each coil 402, 404 have an inner starting point. The inner starting point (e.g. 410) of a coil (e.g. 402) is at a location where a first winding of a coil 402 begins. The first winding is closer to the center point 408 than additional windings of the coil 402. The inner starting point of a coil for each coil is a same radius from the center point 408 to bring symmetry to the coils 402, 404. For example, the inner starting point 410 of the first coil 402 may have a radius 414 from the center point 408 and the inner starting point 412 of the second coil 404 also has the same radius 414 from the center point 408. By positioning the inner starting points 410, 412 at a same radius 414 from the center point 408, the coils 402, 404 may be constructed to be symmetrical about the center point 408, which may help in creating coils of a similar or same inductance.

In another embodiment, the inner starting point for each coil is spaced around a starting point circle 416 equidistant from the inner starting point for other coils. The starting point circle 416 is centered about the center point 408, and in one embodiment, has a radius 414 that is the same radius 414 as the inner starting points 410, 412 of the coils 402, 404. For example, with two coils, e.g. the first coil 402 and the second coil 404, the inner starting points 410, 412 are 180 degrees apart around the starting point circle 416. For three coils the inner starting points may be spaced 120 degrees apart, for four coils the inner starting points may be spaced 90 degrees apart, etc.

In one embodiment, each coil 402, 404 is wound so that at a particular radial 418 from the center point 408, each successive winding around an innermost winding is further from the previous winding and positioned substantially planar with respect to a line perpendicular to the center point 408 so that the plane is perpendicular to the line. For example, the coils 402, 404 may be arranged as in FIGS. 4 and 5 where the coils 402, 404, etc. are arranged next to each other in a same plane so that each winding of each coil 402, 404, 502, 504 is arranged to be substantially planar. In another embodiment, at least some of the windings are positioned in a different plane. For example, some of the windings may be stacked on top of windings adjacent to the ferrite structure 406. When windings are in different planes, in one embodiment, the coils 402, 404 each have a same winding in a different plane to maintain symmetry.

Figure 5:
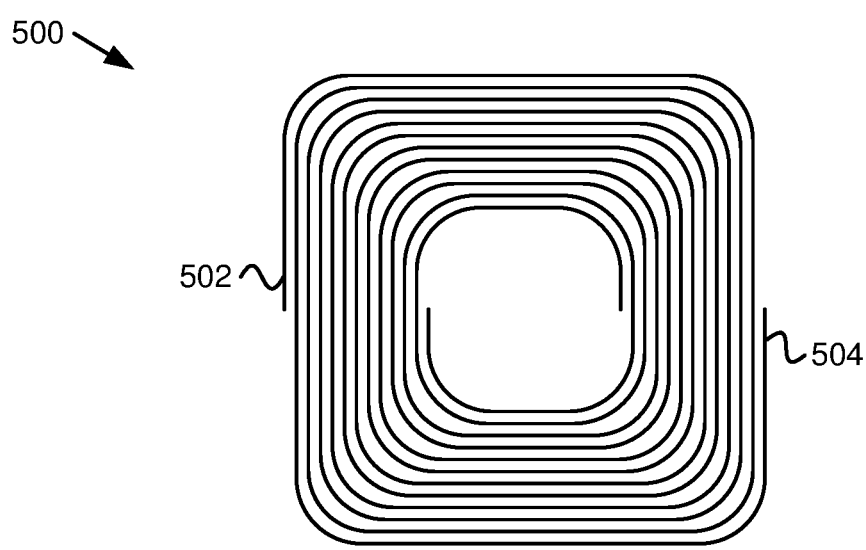
FIG. 5 is a schematic block diagram illustrating one embodiment of an apparatus for wireless power transfer with two coils in a square pattern.

In one embodiment, each coil 402, 404 is arranged in an Archimedean spiral. An Archimedean spiral, also known as an arithmetic spiral, is constructed of a locus of points corresponding to the locations over time of a point moving away from a center point 408 with a constant speed along a line which rotates with constant angular velocity. In another embodiment, each coil 402, 404 is arranged in an irregular spiral. The irregular spiral may include portions of a winding that vary in radius with respect to the center point 408 other than variation between a starting point and an ending point of a winding to accommodate beginning of a next winding of the coil and to allow for windings of one or more additional coils. FIG. 5 is an example of an irregular spiral. FIG. 5 a schematic block diagram illustrating one embodiment of an apparatus 500 for wireless power transfer with two coils 502, 504 in a square pattern. Other irregular spirals may also be used, such as a D-shaped pattern. One of skill in the art will recognize other designs that include multiple coils connected in parallel.

Figure 6A:
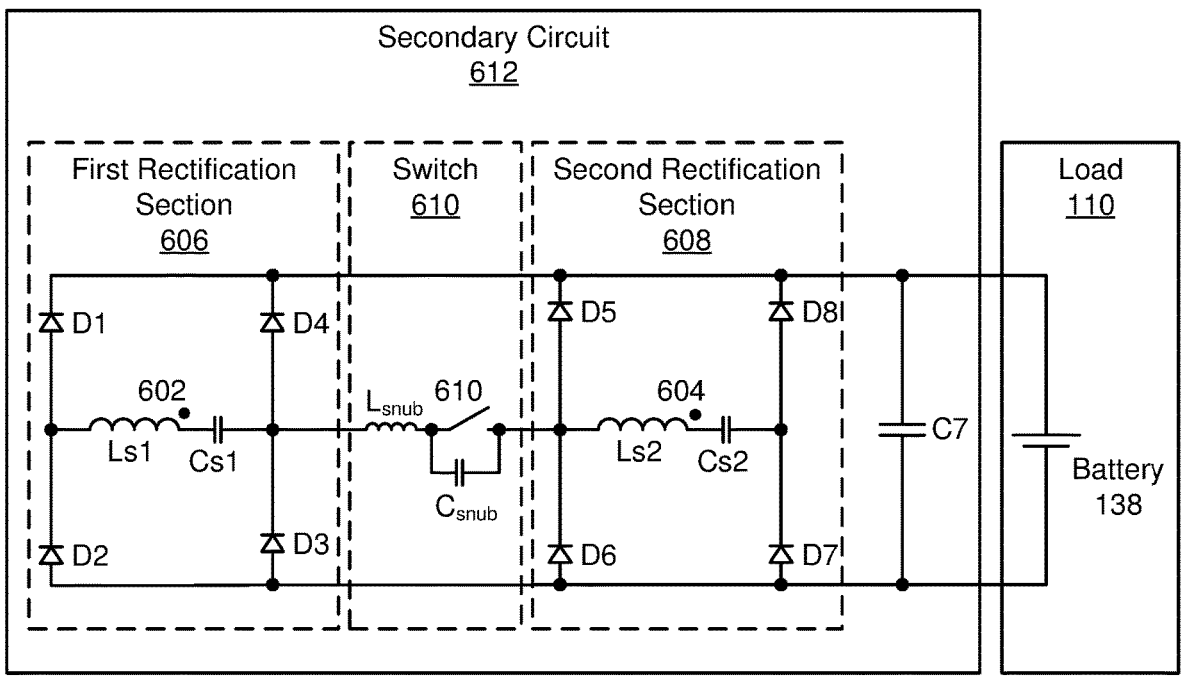
FIG. 6A is a schematic block diagram illustrating one embodiment of an apparatus with a variable secondary circuit feeding a load.

FIG. 6A is a schematic block diagram illustrating one embodiment of an apparatus 600 with a variable secondary circuit 612 feeding a load 110. The variable secondary circuit 612 includes first winding 602 in parallel with a second winding 604. For example, the first and second windings 602, 604 may be similar to those of the coils 402, 404, 502, 504 of a WPT secondary pad 128 of FIG. 4 or 5. The first winding 602, such as the secondary pad 128 and an associated tuning section 302 of FIG. 3A, is represented by an inductor Ls1 and a capacitor Cs1. Likewise, the second winding 604, which may also include a coil of the secondary pad 128 and an associated tuning section 302, is represented by another inductor Ls2 and capacitor Cs2.

The first winding 602 is connected to a first rectification section 606 that receives power from the first winding 602. The second winding 604 is connected to a second rectification section 608 that receives power from the second winding 604. In one embodiment, the first and second rectification sections 606, 608 are full bridge rectifiers. In another embodiment, a first end of the first winding 602 is connected to a center point of series-connected diodes D1, D2 of a first leg of the first rectification section 606 and a second end of the first winding 602 is connected to a center point of series-connected diodes D3, D4 of a second leg of the first rectification section 606. In another embodiment, a first end of the second winding 604 is connected to a center point of series-connected diodes D5, D6 of a first leg of the second rectification section 608 and a second end of the second winding 604 is connected to a center point of series-connected diodes D7, D8 of a second leg of the second rectification section 608.

The WPT secondary pad 128 receives power from a primary pad 126. As depicted in FIG. 6A, the first rectification section 606 is connected in parallel with the second rectification section 608 and the parallel connection between the first and second rectification sections 606, 608 form output terminals. A top of the first and second legs of the first and second rectification sections 606, 608 are connected to a first terminal of the output terminals, and a bottom of the first and second legs of the first and second rectification sections 606, 608 are connected to a second terminal of the output terminals. The output terminals are connected to the load 110.

A switch 610 connects the first winding 602 in series with the second winding 604, which changes current to the load 110. In one embodiment, a controller (not shown) intermittently opens and closes the switch 610 to control voltage and current at the output terminals. For example, closing the switch 610 increases current to the load 110. With the switch 610 closed, voltage across the secondary pad 128 increases, which increases a distance the secondary pad 128 can be from the primary pad 126 while maintaining an acceptable coupling coefficient between the primary and secondary pads 126, 128.

In one embodiment, the controller closes or opens the switch 610 to adjust for physical conditions between the primary pad 126 and secondary pad 128, such as distance, misalignment, etc. between the pads 126, 128. For example, for nominal conditions, the controller may keep the switch 610 open and for conditions with increased distance between the pads 126, 128, the controller may close the switch 610.

Figure 8:
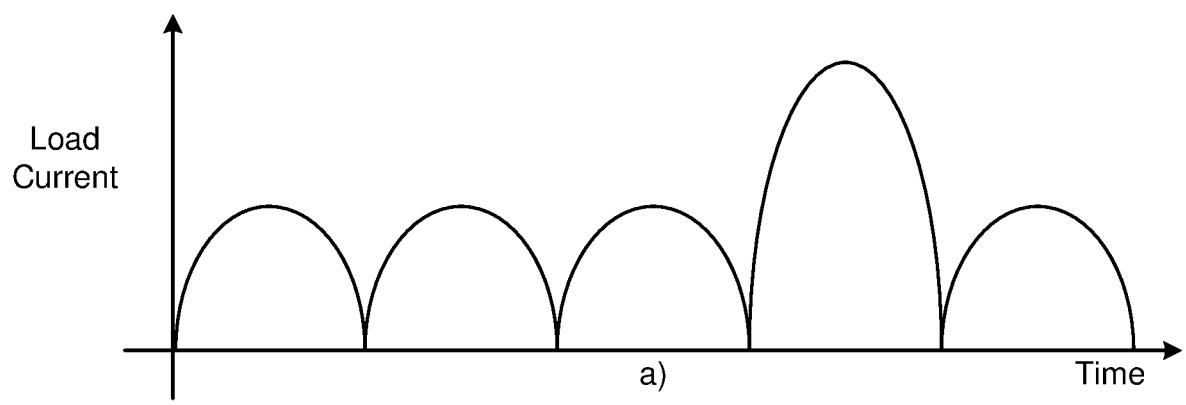
FIG. 8 is a waveform for output current to a load when a variable secondary circuit switches between cycles.
Figure 8:
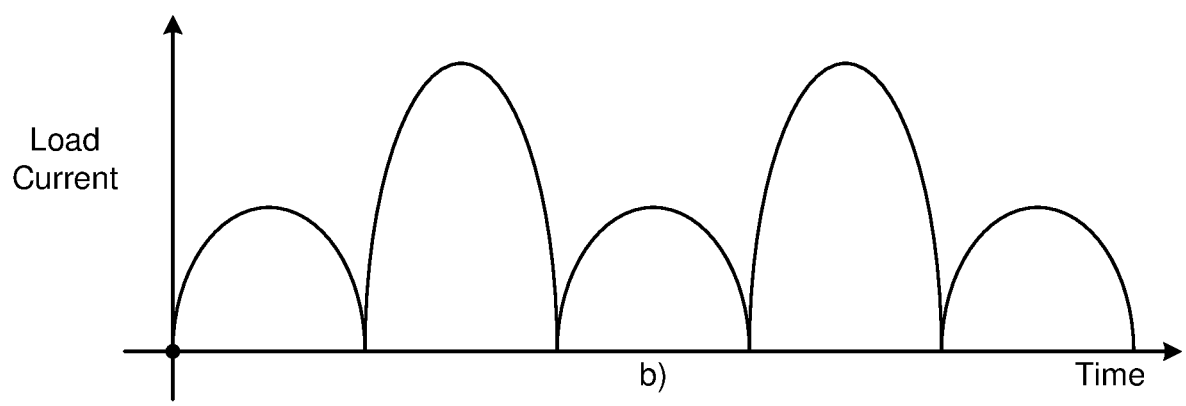

In other embodiments, the controller closes the switch 610 between cycles when voltage across the switch is low. For example, the controller may leave the switch open for N cycles and may leave the switch 610 closed for M cycles. The top part of FIG. 8 labeled "a)" is a potential output current waveform where the switch 610 is open for three half-cycles and closed for one half cycle. The bottom part of FIG. 8 labeled "b)" is a potential output current waveform illustrating the switch 610 open for a first half cycle and closed for a second half cycle and then alternating opening and closing the switch 610 for each half cycle. Varying the amount of cycles that the switch is closed versus open provides a variation in range of the WPT system 100. Closing the switch 610 between cycles or when the voltage across the switch is low reduces stress on the switch 610 and reduces switching losses. However, having some pulses with the switch open and other pulses with the switch closed causes higher harmonics than operating with the switch 610 remaining open or remaining closed. In addition, only discrete changes are possible, e.g "N" cycles open and "M" cycles closed, which naturally provides a very limited number of combinations.

In other embodiments, the controller opens and closes the switch 610 during a cycle of the fundamental frequency of power received at the secondary pad 128. For example, the controller may operate the switch 610 according to a duty cycle associated with a fundamental frequency of power received by the secondary pad 128. If the duty cycle is 60% on a half-cycle basis, the controller may open the switch 610 at the beginning of each cycle and close the switch 610 60% into each half cycle so that for a portion of each half cycle the windings 602, 604 are connected in parallel and after the switch 610 is closed the windings 602, 604 are connected in series. Closing the switch 610 during a portion of a half cycle typically would require the switch 610 to be closed with voltage across the switch 610, which causes stress on the switch 610 and losses. In one embodiment, snubbing circuitry is included, such as an inductor Lsnub or capacitor Csnub.

Adjusting the duty cycle is advantageous to continuously adjust the characteristics of the variable secondary circuit 612 to adapt to various physical alignment and distance between the pads 126, 128. Switching during each half cycle, in some embodiments, has less of an impact on harmonics and/or has more manageable harmonics than switching between cycles.

Figure 6B:
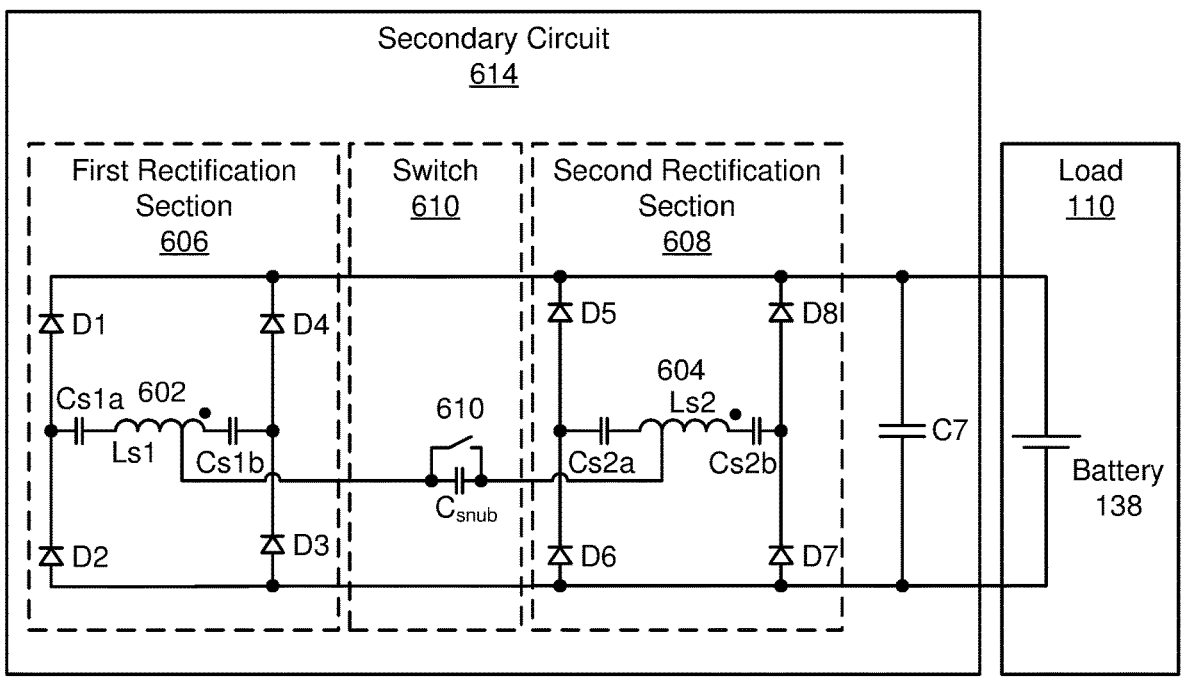
FIG. 6B is a schematic block diagram illustrating an alternate embodiment of an apparatus with a variable secondary circuit feeding a load.

FIG. 6B is a schematic block diagram illustrating an alternate embodiment of an apparatus 601 with a variable secondary circuit 614 feeding a load 110. The apparatus 601 is substantially similar to the apparatus 600 of FIG. 6A except that the snubber inductor Lsnub is removed and the switching leg taps into to the first and second windings 602, 604 and a capacitor is added to each winding so that the first winding 602 includes capacitors Cs1$a$ and Cs1$b$ and the second winding 604 includes capacitors C2s1 and Cs2$b$. The embodiment depicted in FIG. 6B uses a portion of each of the first and second windings 602, 604 and additional capacitors Cs1$b$, Cs2$b$ as an alternate snubbing technique to provide commutation of the switch 610 to reduce stress on the switch 610.

Figure 9:
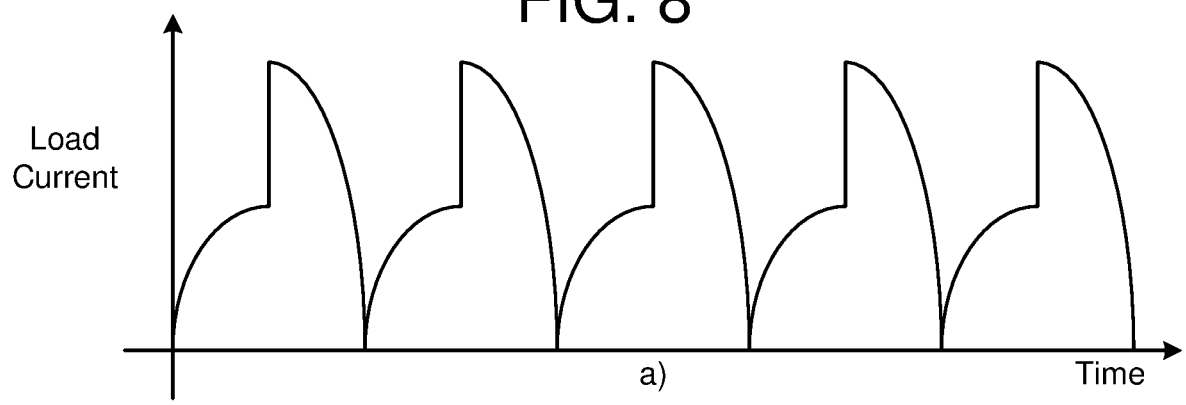
FIG. 9 is a waveform for output current to a load when a variable secondary circuit switches mid-half cycle according to a duty cycle.
Figure 9:
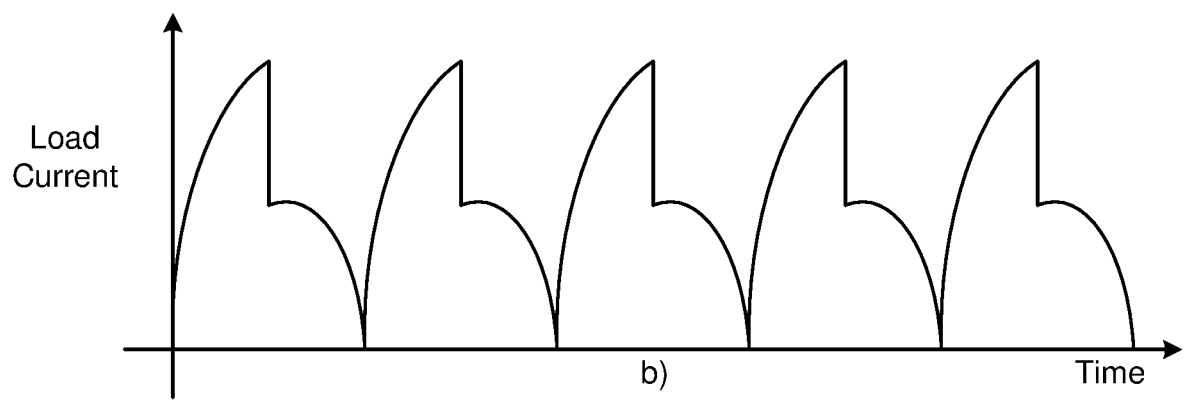

The top diagram of FIG. 9 labeled "a)" is a potential output current waveform for a duty cycle of 0.5 for each half cycle where the switch 610 is closed for the first half of each half cycle and is open for the second half of each half cycle. The bottom diagram of FIG. 9 labeled "b)" is a potential output current waveform for a duty cycle of 0.5 for each half cycle where the switch 610 is open for the first half of each half cycle and is closed for the second half of each half cycle. The controller can vary the duty cycle over a range of 0 to 1 to continuously adjust the secondary circuit 614 between a condition where the switch 610 is continually open to a condition where the switch 610 is continually closed.

Figure 7A:
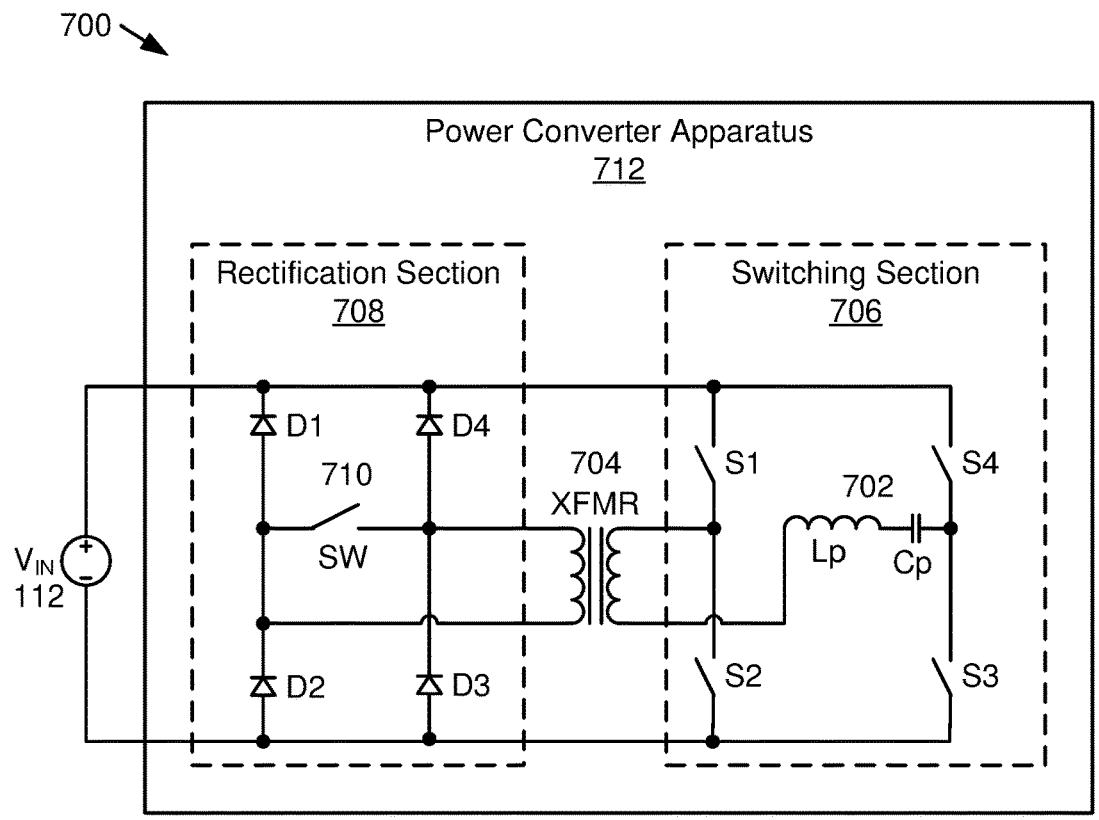
FIG. 7A is a schematic block diagram illustrating one embodiment of a variable power converter apparatus.

FIG. 7A is a schematic block diagram illustrating one embodiment 700 of a variable power converter apparatus 712. The embodiment 700 includes a tuning section 204 and a primary pad 126 represented as a resonant section 702 with an inductor Lp and capacitor Cp. A transformer 704 with N turns includes a first side and a second side. The first side of the transformer 704 is connected in series with the resonant section 702. The embodiment 700 includes a switching section 706 in a full-bridge topology. The switching section 706 includes a first leg and a second leg, each with a center point. The first leg includes two switches S1 and S2 with the center point between the switches S1, S2 connected to the first side of the transformer 704. The second leg of the switching section 706 includes two switches S3 and S4 with a center point connected to the resonant section 702. One of skill in the art will recognize that the resonant section 702 and first side of the transformer 704 could be reversed.

The embodiment 700 includes a rectification section 708 that includes a full bridge rectifier. The depicted rectification section 708 includes diodes D1-D4, but one of skill in the art will recognize other components that could be used for a rectification function. The rectification section 708 includes a first leg with two series-connected diodes D1 and D2 and a center point and a second leg with two series-connected diodes D3, D4 and a center point where the center points of the first and second legs are connected to the second side of the transformer 704. A switch 710 is connected in parallel with the second side of the transformer 704 to the center points of the first and second legs of the rectification section 708. A controller (not shown) opens and closes the switch 710.

When the switch 710 is closed, the second side of the transformer 704 is shorted so the first side of the transformer 704 appears as a short and the power converter apparatus 712 is similar to the power converter apparatus 104 of FIG. 2A. Voltage across the resonant section 702 is about the same as the source voltage Vin 112. When the switch 710 is open, the transformer 704 acts to reduce the voltage across the resonant section 702. The turns ratio N of the transformer 704 determines an amount of voltage reduction for the resonant section 702. For example, if the input voltage is 600 volts ("V") and the transformer ratio N is such that voltage across the first side of the transformer is 100 V, when the switch 710 is open the voltage across the resonant section 702 may be reduced to 500V. Thus, the variable power converter apparatus 712 of FIG. 7A can be used to adjust voltage on the primary side of the WPT system 100.

In one embodiment, the controller opens and closes the switch 710 based on a duty cycle with respect to a switching frequency of the switching section 706. For example, the controller may operate the switch 710 at a 50% duty cycle rate on a half-cycle basis. In the embodiment, the controller may initially have the switch 710 closed and then may open the switch half way into a half cycle so that voltage across the resonant section 702 is initially at V1 and the controller opens the switch 710 half way through the first half cycle so voltage is across the resonant section 702 is V2. The average voltage across the resonant section 702 is then an average of (V1+V2)/2. Other duty cycles may be used to create other voltages across the resonant section 702. Snubbing circuitry may also be used for the switch 710 to reduce stress on the switch 710 and to reduce power loss.

Figure 7B:
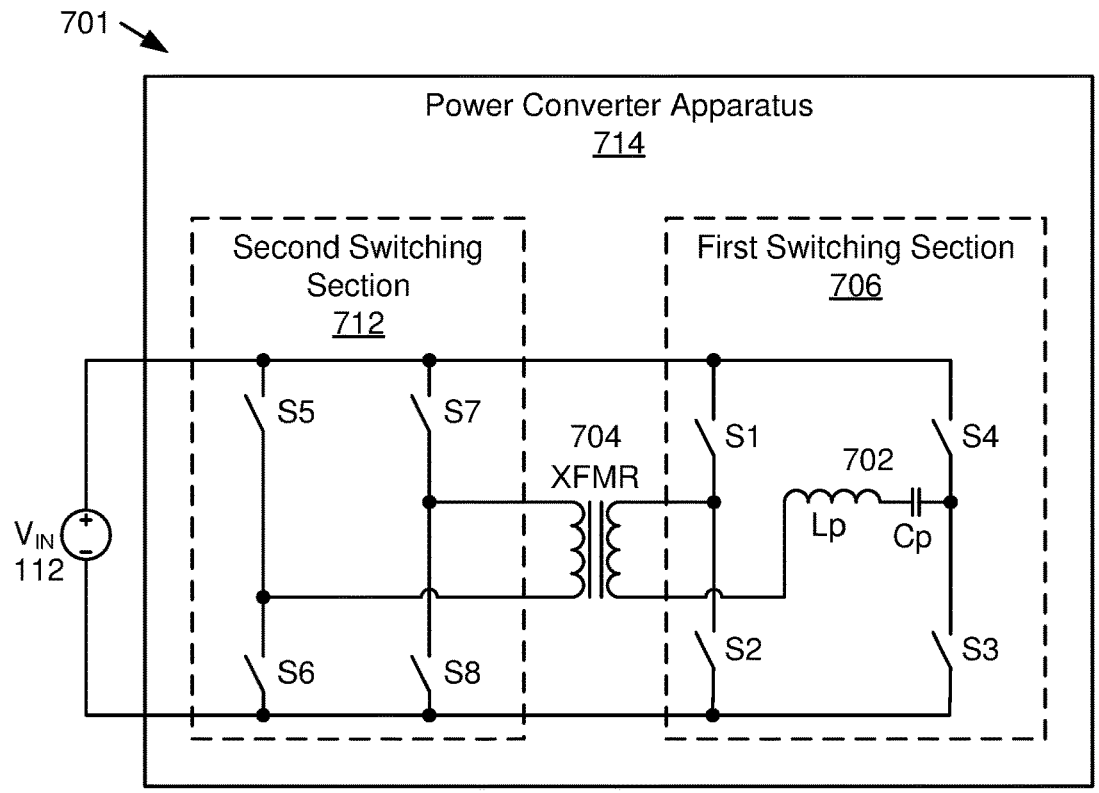
FIG. 7B is a schematic block diagram illustrating an alternate embodiment of a variable power converter apparatus.

FIG. 7B is a schematic block diagram illustrating an alternate embodiment 701 of a variable power converter apparatus 714. The components of the embodiment 701 are substantially similar to the components of the embodiment 700 of FIG. 7A except that the switching section 706 becomes a first switching section 706 and the rectification section 708 becomes a second switching section 712 with diodes D1-D4 replaced with switches S5-S8 and the switch 710 removed. In the embodiment 701, the switches S5-S8 of the second switching section may be used to reverse polarity of voltage applied to the second side of the transformer 704. Where the turns ratio N of the transformer 704 is set for 100 V across the first side of the transformer, the switches S5-S8 can be used to apply a +100 V or a −100 V across the first side of the transformer 704. With the switches S5-S8 of the second switching section 712, the switch 710 across the second side of the transformer 704 may be eliminated. As with the embodiment 700 of FIG. 7A, the controller may be used to switch within a half cycle according to a duty cycle. The embodiment 701 of the power converter apparatus 714 of FIG. 7B provides an increased voltage range as compared to the embodiment 700 of the power converter apparatus 712 of FIG. 7A.

The apparatuses 600, 601 of FIGS. 6A and 6B can be used in conjunction with the power converter apparatuses 700, 701 to provide a wider range of operation than if just the secondary side or just the primary side was used for varying operating conditions. One of skill in the art will recognize other ways that the variable secondary circuits 612, 614 of FIGS. 6A and 6B and the variable power converter apparatuses 7A and 7B may be used to vary operating conditions of the WPT system 100.

Figure 10A:
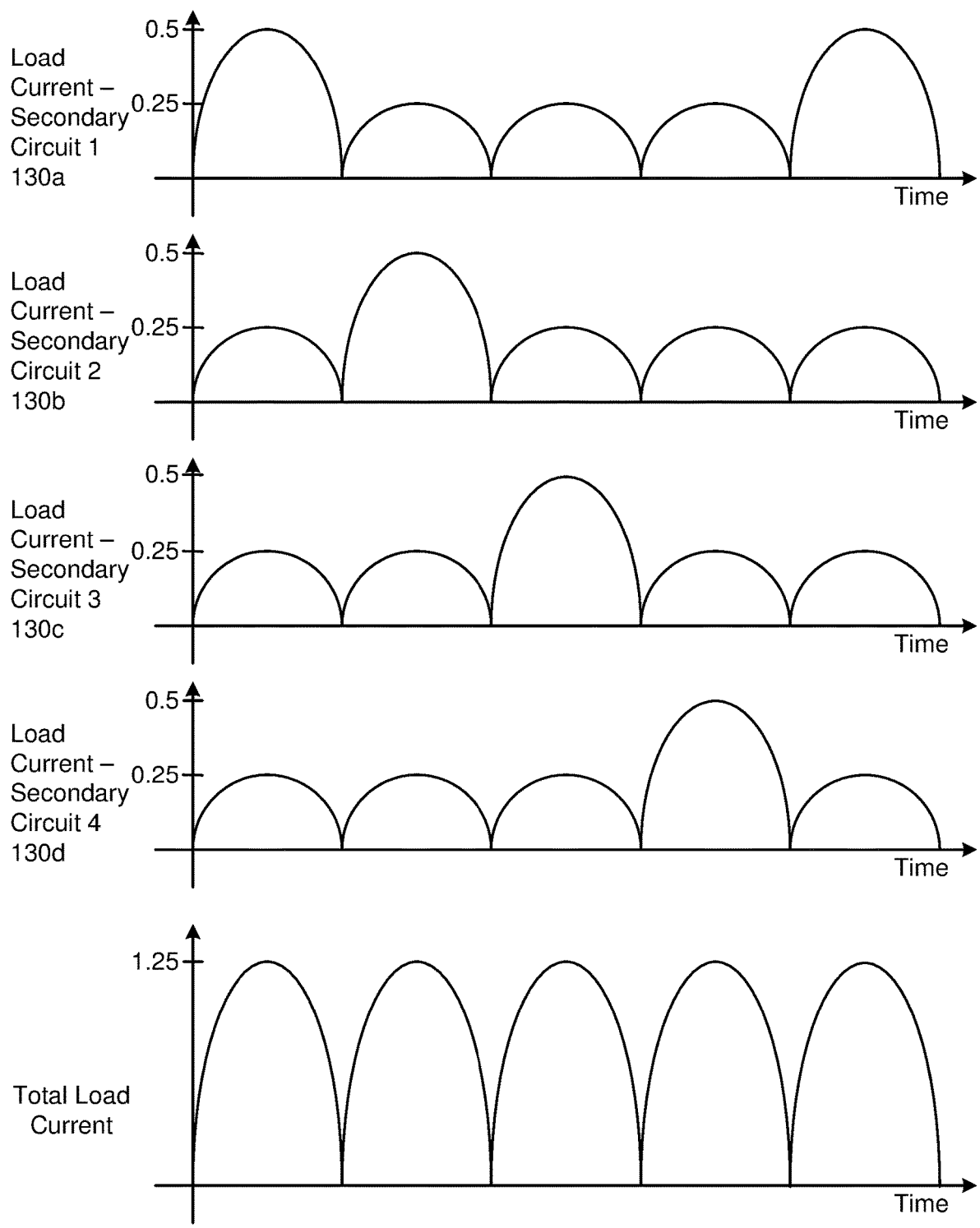
FIG. 10A is a waveform illustrating output current of each of four interleaved variable secondary circuits with one switch closed.

In one embodiment, the WPT system 100 includes four interleaved windings on the secondary as depicted in FIG. 3B where each secondary circuit 130 is a variable secondary circuit 612 of FIG. 6A, or may be a variable secondary circuit 614 of FIG. 6B. There are four interleaved windings in a secondary pad apparatus 128: winding 1 128*a*, winding 2 128*b*, winding 3 128*c*, winding 4 128*d*, as depicted in FIG. 3B. The secondary circuits 130*a-d* as modified in FIG. 6A (i.e. 612*a-d*), are then combined on a secondary DC bus 308, which feeds a load 110, such as a battery 138. FIG. 10A depicts load current for each of the four variable secondary circuits 612*a-d*. Having four interleaved windings 128*a-d* feeding four variable secondary circuits 612*a-d* is advantageous to reduce harmonics while providing a variable topology that provides incremental gain steps of 100%, 125%, 150%, 175% and 200%.

FIG. 10A is an example of a 125% gain where each of the variable secondary circuits 612*a-d* are sequenced on a half-cycle basis over a total of two cycles. As depicted in FIG. 10A, during a first half cycle, the controller closes the switch 610 on the first secondary circuit 612*a* while the switches 610 on the other three secondary circuits 612*b*, 612*c*, 612*d* are open. During a next half cycle, the controller closes the switch 610 on the second secondary circuit 612*b* while maintaining the switches on the first, third and fourth secondary circuits 612*a*, 612*c*, 612*d* open. During the third half cycle the controller closes the switch 610 on the third secondary circuit 612*c* while keeping the switch 610 on the first, second and forth secondary circuits 612*a*, 612*b*, 612*d* open. During the fourth half cycle the controller closes the switch 610 on the fourth secondary circuit 612*d* while keeping the switch 610 on the first, second and third secondary circuits 612*a*, 612*b*, 612*c* open. This cycle then repeats. Note that the sum of the load currents is 125% for all half cycles.

Figure 10B:
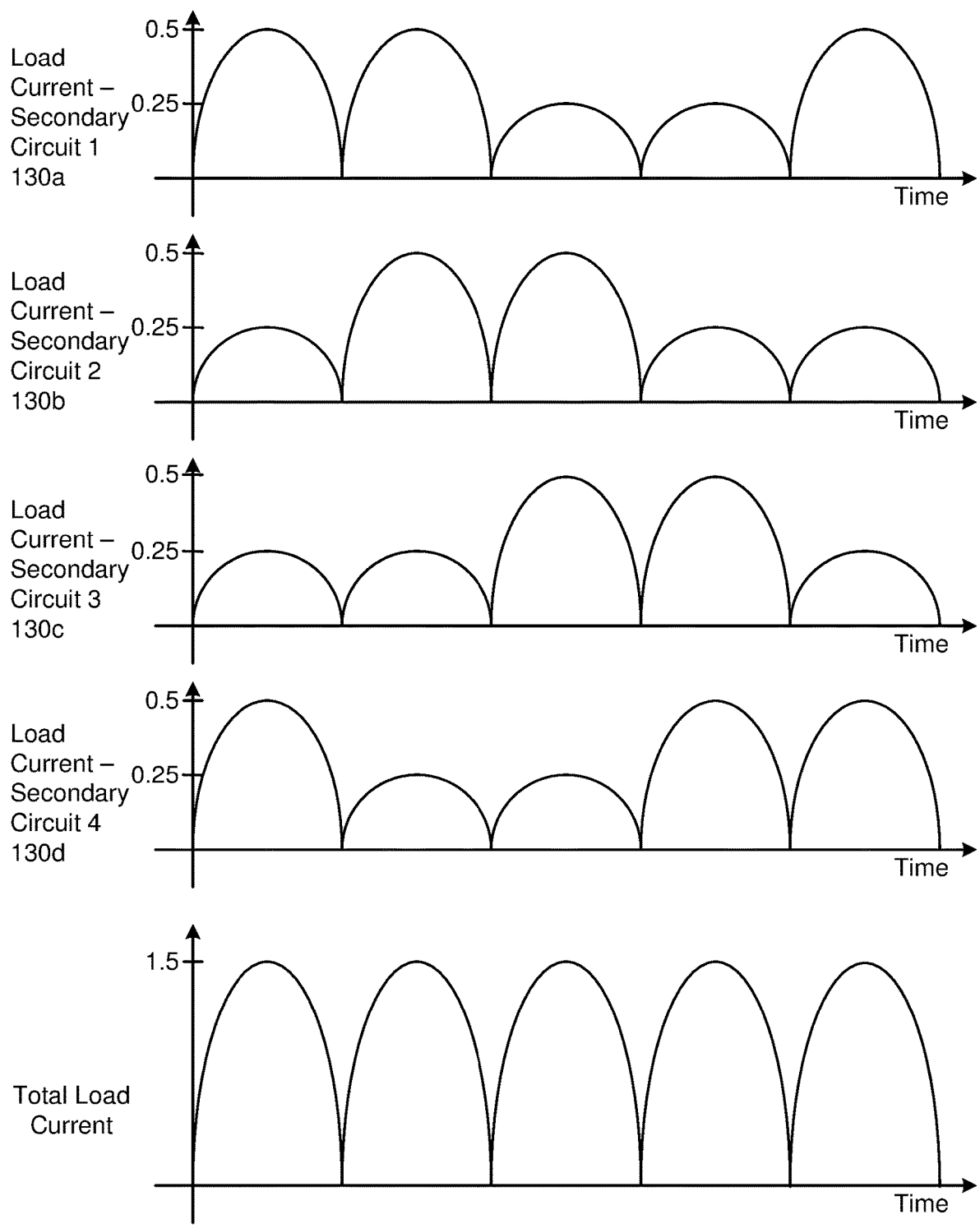
FIG. 10B is a waveform illustrating output current of each of four interleaved variable secondary circuits with two switches closed.

FIG. 10B is an example of a 150% gain where each of the variable secondary circuits 612*a-d* are sequenced on a half-cycle basis over a total of two cycles. As depicted in FIG. 10B, during a first half cycle, the controller closes the switch 610 on the first secondary circuit 612*a* and fourth secondary circuit 612*d* while the switches 610 on the other two secondary circuits 612*b*, 612*c* are open. During a next half cycle, the controller closes the switch 610 on the first and second secondary circuits 612*a*, 612*b* while maintaining the switches on the third and fourth secondary circuits 612*c*, 612*d* open. During the third half cycle the controller closes the switch 610 on the second and third secondary circuits 612*b*, 612*c* while keeping the switch 610 on the first and forth secondary circuits 612*a*, 612*d* open. During the fourth half cycle the controller closes the switch 610 on the third and fourth secondary circuits 612*c*, 612*d* while keeping the switch 610 on the first and second secondary circuits 612*a*, 612*b* open. This cycle then repeats. Note that the sum of the load currents is 150% for all half cycles. The switching can be modified to close more or less switches 610 for the variable secondary circuits 612*a-d* to further adjust gain.

In other embodiments, the variable secondary circuit 614 of FIG. 6B may be used for interleaved windings 128*a-d* and duty cycle can be varied among the secondary circuits 614*a-d* to vary harmonics. One of skill in the art will recognize other ways to use the variable circuits 612, 614 of FIGS. 6A and 6B in an interleaved design to vary gain of the secondary of the WPT system 100 while controlling harmonics.

In some embodiments, multiple power converter apparatuses 712 or 714 are grouped in parallel so that the windings (e.g. 1-4) of the resonant sections 702 are combined into a single pad 126, similar to the primary pad 126 of FIG. 2B. In some embodiments, a single power source 112, two power sources 112, etc. may connect to paralleled power converter apparatuses 712 or 714. The windings 1-4 126*a-d* of the combined primary pad 126, in some embodiments, align with the windings 1-4 128*a-d* of the combined secondary pad 128 as in FIG. 3B. One of skill in the art will recognize other ways to combine power converter apparatuses 712, 714, 104 and secondary circuits 612, 614, 130 and secondary pads 128 to achieve a system that varies voltages for different conditions, such as a variable gap 108.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a wireless power transfer ("WPT") secondary pad that receives power wirelessly from a WPT primary pad, the WPT secondary pad comprising a first winding and a second winding;
a first rectification section that receives power from the first winding;
a second rectification section that receives power from the second winding, the first rectification section connected in parallel with the second rectification section, the parallel connection between the first and second rectification section forming output terminals;
a switch which, when closed, connects the first winding in series with the second winding; and
a controller that controls intermittent opening and closing of the switch and varying an amount of output current cycles during which the switch is closed to control load current at the output terminals.

2. The apparatus of claim 1, wherein each of the first rectification section and the second rectification section comprise a full bridge rectifier.

3. The apparatus of claim 2, wherein:
a first end of the first winding is connected to a center point of series-connected diodes of a first leg of the first rectification section and a second end of the first winding is connected to a center point of series-connected diodes of a second leg of the first rectification section;
a first end of the second winding is connected to a center point of series-connected diodes of a first leg of the second rectification section and a second end of the second winding is connected to a center point of series-connected diodes of a second leg of the second rectification section; and
a top of the first and second legs of the first and second rectification section are connected to a first terminal of the output terminals, and a bottom of the first and second legs of the first and second rectification section are connected to a second terminal of the output terminals.

4. The apparatus of claim 1, wherein the controller operates the switch according to a duty cycle associated with a fundamental frequency of power received by the WPT secondary pad.

5. The apparatus of claim 4, wherein the controller adjusts the duty cycle to adjust the voltage of the output terminals.

6. The apparatus of claim 4, wherein the controller adjusts the duty cycle to adjust the load current of the output terminals.

7. The apparatus of claim 1, further comprising snubbing circuitry that provides snubbing for the switch.

8. The apparatus of claim 1, further comprising a direct current ("DC") link capacitor in parallel with the output terminals.

9. An apparatus comprising:
a resonant section of a wireless power transfer ("WPT") converter, the resonant section comprising a WPT primary pad, a first connection, and a second connection;
a switching section comprising a full-bridge topology, the switching section comprising a first leg of the switching section and a second leg of the switching section, each leg of the switching section with a respective center point;
a rectification section comprising a full-bridge rectifier, the rectification section comprising a first leg of the rectification section and a second leg of the rectification section, each leg of the rectification section with a center point;
a transformer with N turns comprising a first side and a second side, a first connection of the first side of the transformer connected in series with the second connection of the resonant section;
a switch connected in parallel with the second side of the transformer; and
a controller to open and close the switch to apply an output voltage to the WPT primary pad,
wherein the first connection of the resonant section and a second connection of the first side of the transformer are connected to the center points of the first and second legs of the switching section, respectively, and
wherein the second side of the transformer is connected between the center points of the first and second legs of the rectification section, respectively.

10. The apparatus of claim 9, wherein the legs of the rectification section and the legs of the switching section are connected in parallel and form input terminals to be connected to a power source.

11. The apparatus of claim 9, wherein the rectification section comprises diodes.

12. The apparatus of claim 9, wherein the controller opens or closes the switch to select an output voltage applied to the resonant section.

13. The apparatus of claim 12, wherein the N turns of the transformer are selected based on an amount of voltage to be added to or subtracted from a source voltage to apply a particular voltage to the resonant section.

14. The apparatus of claim 9, wherein the controller operates the switch according to a duty cycle, the duty cycle relative to a switching frequency of the switching section.

15. The apparatus of claim 14, wherein the controller varies the duty cycle to adjust a voltage applied to the resonant section.

16. The apparatus of claim 9, wherein the resonant section comprises one or more inductors and one or more capacitors arranged to be connected between the primary pad and the first and second connections of the resonant section.

17. The apparatus of claim 16, wherein the one or more inductors and one or more capacitors are arranged with the primary pad to form an inductor-capacitor-inductor ("LCL") load resonant converter.

18. A system comprising:
a primary converter apparatus comprising:
a resonant section of a wireless power transfer ("WPT") converter, the resonant section comprising a WPT primary pad, a first connection, and a second connection;
a switching section comprising a full-bridge topology, the switching section comprising a first leg of the switching section and a second leg of the switching section, each leg of the switching section with a respective center point;
a rectification section comprising a full-bridge rectifier, the rectification section comprising a first leg of the rectification section and a second leg of the rectification section, each leg of the rectification section with a center point;
a transformer with N turns comprising a first side and a second side, a first connection of the first side of the transformer connected in series with the second connection of the resonant section;
a primary switch connected in parallel with the second side of the transformer; and a primary controller to open and close the primary switch to apply an output voltage to the WPT primary pad, wherein the first connection of the resonant section and a second connection of the first side of the transformer are connected to the center points of the first and second legs of the switching section, respectively, and wherein the second side of the transformer is connected between the center points of the first and second legs of the rectification section, respectively; and a secondary receiver apparatus comprising:
  a WPT secondary pad that receives power wirelessly from the WPT primary pad, the WPT secondary pad comprising a first winding and a second winding;
  a first rectification section that receives power from the first winding;
  a second rectification section that receives power from the second winding, the first rectification section connected in parallel with the second rectification section, the parallel connection between the first and second rectification section forming output terminals;
  a secondary switch which, when closed, connects the first winding in series with the second winding; and
  a secondary controller that controls intermittent opening and closing of the secondary switch and varying an amount of output current cycles during which the second switch is closed to control load current at the output terminals.

19. The system of claim 18, further comprising two or more primary converter apparatuses connected in parallel and comprising two or more corresponding secondary receiver apparatuses connected in parallel, the two or more corresponding secondary receiver apparatuses connected in parallel feed a load.

20. The system of claim 19, wherein the WPT primary pad of each of the two or more primary converter apparatuses comprises a primary winding and the primary windings are configured to form the WPT primary pad, wherein the WPT secondary pad of each of the two or more corresponding secondary receiver apparatuses connected in parallel comprises a secondary winding and the secondary windings are configured to form the WPT secondary pad, and wherein each of the primary windings align with the secondary windings.

* * * * *